(12) United States Patent
Wang

(10) Patent No.: US 9,654,172 B2
(45) Date of Patent: May 16, 2017

(54) METHOD AND DEVICE FOR LINE INITIALIZATION

(71) Applicant: Huawei Technologies Co., Ltd., Shenzhen (CN)

(72) Inventor: Xiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 14/747,100

(22) Filed: Jun. 23, 2015

(65) Prior Publication Data
US 2015/0295621 A1 Oct. 15, 2015

Related U.S. Application Data

(63) Continuation of application No. PCT/CN2012/087494, filed on Dec. 26, 2012.

(51) Int. Cl.
*H04B 3/32* (2006.01)
*H04M 11/06* (2006.01)
(Continued)

(52) U.S. Cl.
CPC ......... *H04B 3/32* (2013.01); *H04L 25/03898* (2013.01); *H04L 27/2613* (2013.01);
(Continued)

(58) Field of Classification Search
CPC ....... H04B 3/32; H04B 7/0456; H04L 1/0042; H04L 25/0391; H04L 25/03898;
(Continued)

(56) References Cited

U.S. PATENT DOCUMENTS

| 5,987,061 A | 11/1999 | Chen |
| 8,194,767 B2 * | 6/2012 | Duvaut ................ H04B 3/32 375/260 |

(Continued)

FOREIGN PATENT DOCUMENTS

| CN | 101420334 A | 4/2009 |
| CN | 101510820 | 8/2009 |

(Continued)

OTHER PUBLICATIONS

"Self-FEXT Cancellation (Vectoring) for Use With VDSL2 Transceivers," ITU-T Telecommunication Standardization Sector of ITU, Series G: Transmission Systems and Media, Digital Systems and Networks, Digital Sections and Digital Line System—Access Networks, G.993.5, Apr. 2010, 80 pages.

*Primary Examiner* — Ahmed Elallam
(74) *Attorney, Agent, or Firm* — Slater Matsil, LLP

(57) ABSTRACT

The present invention provides a method and a device for line initialization. In the method, first, a first precoding matrix needed by a first part of subcarriers is acquired in a downstream direction, and then multiple data signals of all data signals that need to be sent in an initialization process are sent by using only the first part of subcarriers; afterward, a second precoding matrix needed by at least a second part of subcarriers of all available subcarriers is acquired, and remaining data signals of all the data signals exclusive of the multiple data signals are sent by using the at least second part of subcarriers to complete line initialization. By using the foregoing manner, the present invention can cancel crosstalk between lines while completing line initialization, and does not easily cause transmit power to exceed a limit.

21 Claims, 6 Drawing Sheets

(a)

(b)

(51) Int. Cl.
*H04M 3/34* (2006.01)
*H04L 27/26* (2006.01)
*H04L 25/03* (2006.01)
*H04M 3/30* (2006.01)

(52) U.S. Cl.
CPC ....... *H04L 27/2634* (2013.01); *H04M 11/062* (2013.01); *H04M 3/306* (2013.01); *H04M 3/34* (2013.01)

(58) Field of Classification Search
CPC ............ H04L 27/2613; H04L 27/2634; H04M 11/062; H04M 3/306; H04M 3/304; H04M 3/34
See application file for complete search history.

(56) References Cited

U.S. PATENT DOCUMENTS

| | | | |
|---|---|---|---|
| 8,644,127 B2 * | 2/2014 | Biyani | H04B 3/32 370/201 |
| 9,225,826 B2 * | 12/2015 | Shi | H04M 11/062 |
| 9,525,459 B2 * | 12/2016 | Pei | H04B 3/32 |
| 9,544,423 B2 * | 1/2017 | Wei | H04M 3/34 |
| 2009/0059780 A1 | 3/2009 | De Lind Van Wijngaarden et al. | |
| 2010/0195817 A1 | 8/2010 | Cendrillon et al. | |
| 2012/0151305 A1 | 6/2012 | Zhang et al. | |
| 2013/0336413 A1 * | 12/2013 | Lv | H04L 1/06 375/257 |
| 2014/0140187 A1 | 5/2014 | Wang et al. | |
| 2016/0173682 A1 * | 6/2016 | Lu | H04M 3/18 379/406.01 |
| 2016/0373168 A1 * | 12/2016 | Verbin | H04B 3/32 |

FOREIGN PATENT DOCUMENTS

| | | |
|---|---|---|
| CN | 101790851 A | 7/2010 |
| CN | 102025396 A | 4/2011 |
| CN | 103229445 A | 7/2013 |
| EP | 2136477 A1 | 12/2009 |
| WO | 2007130808 A2 | 11/2007 |
| WO | 2012106936 A1 | 8/2012 |

* cited by examiner

METHOD AND DEVICE FOR LINE INITIALIZATION

This application is a continuation of International Application No. PCT/CN2012/087494, filed on Dec. 26, 2012, which is hereby incorporated by reference in its entirety.

TECHNICAL FIELD

The present invention relates to the field of communications technologies, and in particular, to a method and a device for line initialization.

BACKGROUND

A digital subscriber line (DSL) technology is a broadband access technology for transmitting a high-speed data service based on a transmission medium of an ordinary telephone twisted pair (unshielded twist pair, UTP). The digital subscriber line technology mainly uses a frequency division multiplexing technology to implement coexistence of a digital subscriber line service and a POTS plain old telephone service) on a same ordinary telephone twisted pair, without replacing an existing basic transmission medium, and can obtain a high downstream/upstream transmission speed when data transmission is performed by using the existing ordinary telephone twisted pair. In an entire transmission frequency band, the POTS service occupies a baseband part lower than 4 kHz, while a digital subscriber line service occupies a high frequency part, where signals of the two service are separated by using a splitter. The digital subscriber line technology mainly uses a modulation mode, that is, DMT (discrete multi-tone), to improve an anti-interference capability of a digital subscriber line system.

Referring to FIG. 1, FIG. a in FIG. 1 is a schematic diagram of near end crosstalk, and FIG. b is a schematic diagram of far end crosstalk. In a digital subscriber line system, a DSLAM (digital subscriber line access multiplexer, Digital Subscriber Line Access Multiplexer) 101, as a central office end device in the digital subscriber line system, can accommodate multiple DSL lines and optimize a transmission speed. By using two DSL lines, that is, a first line 103 established between a central office end transceiver 1011 and a subscriber end 1021 and a second line 104 established between a central office end transceiver 1012 and a subscriber end 1022, as an example, according to an electromagnetic induction principle, crosstalk is generated between signals of the first line 103 and the second line 104 accessed to the DSLAM. Crosstalk is classified into FEXT (far end crosstalk) and NEXT (near end crosstalk). FEXT refers to interference between upstream signals of different line pairs or between downstream signals of different line pairs, while NEXT is interference between upstream signals and downstream signals of different line pairs.

Both FEXT and NEXT become stronger as the frequency band is higher; and a frequency division multiplexing mode is used in a downstream/upstream channel of a digital subscriber line system. Therefore, NEXT may be canceled or reduced by using a filter, and no great impact is caused to the digital subscriber line system. However, as the frequency band used by the digital subscriber line system is wider, FEXT also becomes stronger continuously. According to Shannon's equation $C = B \cdot \log_2(1+S/N)$ (where C is a channel speed, B is a signal bandwidth, S is signal energy, and N is noise energy), it may be known that if N is larger, C is smaller. In digital subscriber line transmission, crosstalk is reflected as a part of noise, and stronger FEXT indicates larger N. Therefore, severe FEXT dramatically reduces the channel speed. Therefore, when multiple subscribers request to activate a digital subscriber line service in a bundle of cables, because of FEXT, transmission speeds of a part of lines are low, and performance is instable, and even the activation fails, finally resulting in a low service activation rate of the DSLAM.

In view of the foregoing problem, currently, a vectoring technology is proposed in the industry. Mainly, in a DSLAM, downstream precoding and upstream joint reception technologies are used to implement crosstalk cancellation, and by means of interaction between the DSLAM and a terminal, crosstalk vector information in a line is acquired, and then complex matrix calculation is performed to acquire an "inverse" crosstalk signal, and the "inverse" crosstalk signal is superimposed into a digital subscriber line signal. In a transmission process of the digital subscriber line signal, the "inverse" crosstalk signal and FEXT in the line cancel each other, and therefore, impact of the FEXT on line transmission performance is reduced.

In a long-term research and development process, the inventors of the present invention find that the following technical problem exists in the use of the foregoing vectoring technology: At an initial stage of line initialization, a nonlinear precoding technology cannot be used for signal precoding, but using linear coding easily causes a dramatic increase of transmit power. By using crosstalk cancellation in a downstream channel as an example, a vector precoder is introduced in a CO (central office, Central office), and in joint transmission of signals, after a signal is precoded by the vector precoder, an "inverse" crosstalk signal is acquired, and FEXT of the signal is canceled in a transmission process by using the "inverse" crosstalk signal. In the use of the vectoring technology, a crosstalk channel and/or a crosstalk cancellation coefficient needs to be acquired for signal precoding. Precoding modes mainly include linear precoding and nonlinear precoding. When a signal is sent by using a low frequency band, FEXT can be well canceled by using the linear precoding mode. However, as the frequency band becomes higher, when a new line is added, a linear precoder causes an apparent increase of transmit power of a Showtime (transmitting line) port. However, in ordinary devices and systems, transmit power of all ports has an upper limit. Therefore, using the linear precoding mode may cause the transmit power of the Showtime port to exceed the limit. To avoid that the transmit power exceeds the limit when crosstalk cancellation is completed, the nonlinear precoding technology may be used for signal precoding. However, before this mode is used, it is necessary to know all crosstalk channels. At an initial stage of initialization of a new line, before a feedback channel is established for the initializing line, the initializing line can hardly feed back an error signal of a downstream channel through an upstream channel, and a crosstalk channel from a Showtime line to the initializing line and a crosstalk channel from the initializing line to another initializing line cannot be known. Therefore, at the initial stage of line initialization, the nonlinear precoding technology cannot be used to perform signal precoding to cancel crosstalk; and using linear precoding easily causes a dramatic increase of transmit power.

SUMMARY

A main objective of the present invention is to provide a method and a device for line initialization, which can cancel crosstalk between lines while completing line initialization, and does not easily cause transmit power to exceed a limit.

According to a first aspect of the present invention, a method for line initialization is provided, including: sending a first probe signal in a downstream direction to acquire a first precoding matrix needed by a first part of subcarriers of all available subcarriers; sending, by using the first part of subcarriers, multiple data signals of all data signals that need to be sent in an initialization process; after the multiple data signals are sent by using the first part of subcarriers, sending, by using at least a second part of subcarriers of all the available subcarriers, a second probe signal in the downstream direction to acquire a second precoding matrix needed by the at least second part of subcarriers; and sending, by using the at least second part of subcarriers, remaining data signals, exclusive of the multiple data signals, of all the data signals that need to be sent in the initialization process, to complete line initialization.

With reference to the first aspect, in a first possible implementation manner, the step of sending a first probe signal in a downstream direction to acquire a first precoding matrix needed by a first part of subcarriers of all available subcarriers includes: sending, by using at least a third part of subcarriers of all the available subcarriers, the first probe signal in the downstream direction to acquire the first precoding matrix, where the at least third part of subcarriers are any subcarriers of all the available subcarriers.

With reference to the first aspect, in a second possible implementation manner, the first part of subcarriers are a set of subcarriers whose center frequencies are not greater than a designated cutoff frequency in all the available subcarriers; and before the step of sending, by using the first part of subcarriers, multiple data signals of all data signals that need to be sent in an initialization process, the method includes: acquiring a range of the first part of subcarriers according to the designated cutoff frequency; and in a handshake, notifying a subscriber end device in the downstream direction of the range of the first part of subcarriers, or after a handshake is completed, notifying a subscriber end device of the range of the first part of subcarriers when a first data signal of the multiple data signals is sent by using the first part of subcarriers.

With reference to the second possible implementation manner of the first aspect, in a third possible implementation manner, the step of acquiring a range of the first part of subcarriers according to the designated cutoff frequency includes: acquiring the range of the first part of subcarriers according to a subcarrier sequence number threshold corresponding to the designated cutoff frequency.

With reference to the first aspect, in a fourth possible implementation manner, after the step of sending, by using at least a second part of subcarriers of all the available subcarriers, a second probe signal in the downstream direction to acquire a second precoding matrix needed by the at least second part of subcarriers, the method includes: acquiring a range of the second part of subcarriers, and notifying a subscriber end device in the downstream direction of the range of the second part of subcarriers; or notifying a subscriber end device in the downstream direction that the subscriber end device is no longer limited to using the first part of subcarriers for sending the multiple data signals.

According to a second aspect of the present invention, another method for line initialization is provided, including: sending a first probe signal in an upstream direction, so that a central office end device in the upstream direction acquires a first crosstalk cancellation function needed by a first part of subcarriers of all available subcarriers; sending, by using the first part of subcarriers, multiple data signals of all data signals that need to be sent in an initialization process; after the multiple data signals are sent by using the first part of subcarriers, sending, by using at least a second part of subcarriers of all the available subcarriers, a second probe signal in the upstream direction, so that the central office end device acquires a second crosstalk cancellation function needed by the at least second part of subcarriers; and sending, by using the at least second part of subcarriers, remaining data signals, exclusive of the multiple data signals, of all the data signals that need to be sent in the initialization process, to complete line initialization.

With reference to the second aspect, in a first possible implementation manner, the step of sending a first probe signal in an upstream direction, so that a central office end device in the upstream direction acquires a first crosstalk cancellation function needed by a first part of subcarriers of all available subcarriers, includes: sending, by using at least a third part of subcarriers of all the available subcarriers, the first probe signal in the upstream direction, so that the central office end device in the upstream direction acquires the first crosstalk cancellation function, where the at least third part of subcarriers are any subcarriers of all the available subcarriers.

With reference to the second aspect, in a second possible implementation manner, the first part of subcarriers are a set of subcarriers whose center frequencies are not greater than a designated cutoff frequency in all the available subcarriers; and before the step of sending a first probe signal in an upstream direction, so that a central office end device in the upstream direction acquires a first crosstalk cancellation function needed by a first part of subcarriers of all available subcarriers, the method includes: receiving a first designation message carrying information about the designated cutoff frequency, to acquire a range of the first part of subcarriers.

With reference to the second possible implementation manner of the second aspect, in a third possible implementation manner, the step of receiving a first designation message carrying information about the designated cutoff frequency, to acquire a range of the first part of subcarriers, includes: receiving the first designation message carrying information about a subcarrier sequence number threshold corresponding to the designated cutoff frequency, to acquire the range of the first part of subcarriers.

With reference to the second aspect, in a fourth possible implementation manner, before the step of sending, by using at least a second part of subcarriers of all the available subcarriers, a second probe signal in the upstream direction, the method includes: receiving a second designation message carrying information about a range of the at least second part of subcarriers; or receiving a third designation message carrying information indicating that no limitation is set to: using the first part of subcarriers for sending the multiple data signals.

According to a third aspect of the present invention, a communication device is provided, including a control module, a first acquiring module, a sending module, and a second acquiring module, where: the control module is configured to send a first control signal to the first acquiring module, and the first acquiring module is configured to send, after receiving the first control signal, a first probe signal in a downstream direction of an initializing line, to acquire a first precoding matrix needed by a first part of subcarriers of all available subcarriers; the control module is further configured to send a second control signal to the sending module after the first acquiring module acquires the first precoding matrix; the sending module is configured to send, by using the first part of subcarriers after receiving the second control signal, multiple data signals of all data signals that need to be sent in a line initialization process; the control module is configured to send a third control signal to the second acquiring module after the sending module sends the multiple data signals by using the first part of subcarriers, and the second acquiring module is further configured to send, by using at least a second part of subcarriers of all the available subcarriers after receiving the third control signal, a second probe signal in the downstream direction of the initializing line, to acquire a second precoding matrix needed by the at least second part of subcarriers; the control module is further configured to send a fourth control signal to the sending module after the second acquiring module acquires the second precoding matrix; and the sending module is further configured to send, by using the at least second part of subcarriers after receiving the fourth control signal, remaining data signals, exclusive of the multiple data signals, of all the data signals that need to be sent in the initialization process, to complete line initialization.

With reference to the third aspect, in a first possible implementation manner, the first acquiring module is specifically configured to send, by using at least a third part of subcarriers of all the available subcarriers after receiving the first control signal, the first probe signal in the downstream direction of the initializing line, to acquire the first precoding matrix, where the at least third part of subcarriers are any subcarriers of all the available subcarriers.

With reference to the third aspect, in a second possible implementation manner, the first part of subcarriers are a set of subcarriers whose center frequencies are not greater than a designated cutoff frequency in all the available subcarriers; and the device further includes: a third acquiring module, configured to acquire a range of the first part of subcarriers according to the designated cutoff frequency; and a first notifying module, configured to notify, in a handshake, a subscriber end device in the downstream direction of the range of the first part of subcarriers after the third acquiring module acquires the range of the first part of subcarriers, or notify, after a handshake is completed, a subscriber end device of the range of the first part of subcarriers when a first data signal of the multiple data signals is sent by using the first part of subcarriers.

With reference to the second possible implementation manner of the third aspect, in a third possible implementation manner, the third acquiring module is specifically configured to acquire the range of the first part of subcarriers according to a subcarrier sequence number threshold corresponding to the designated cutoff frequency.

With reference to the third aspect, in a fourth possible implementation manner, the terminal device further includes a fourth acquiring module and a second notifying module, where: the fourth acquiring module is configured to acquire a range of the second part of subcarriers; and the second notifying module is configured to notify a subscriber end device in the downstream direction of the range of the second part of subcarriers, or notify a subscriber end device in the downstream direction that the subscriber end device is no longer limited to using the first part of subcarriers for sending the multiple data signals.

According to a fourth aspect of the present invention, a terminal device is provided, including a control module, a first sending module, and a second sending module, where: the control module is configured to send a first control signal to the first sending module, and the first sending module is configured to send, after receiving the first control signal, a first probe signal in an upstream direction of an initializing line, so that a central office end device in the upstream direction acquires a first crosstalk cancellation function needed by a first part of subcarriers of all available subcarriers; the control module is configured to send a second control signal to the second sending module, and the second sending module is configured to send, by using the first part of subcarriers after receiving the second control signal, multiple data signals of all data signals that need to be sent in a line initialization process; the control module is further configured to send a third control signal to the first sending module after the first sending module sends the multiple data signals by using the first part of subcarriers, and the first sending module is configured to send, by using at least a second part of subcarriers of all the available subcarriers after receiving the third control signal, a second probe signal in the upstream direction, so that the central office end device acquires a second crosstalk cancellation function needed by the at least second part of subcarriers; and the control module is further configured to send a fourth control signal to the second sending module, and the second sending module is configured to send, by using the at least second part of subcarriers after receiving the fourth control signal, remaining data signals, exclusive of the multiple data signals, of all the data signals that need to be sent in the initialization process, to complete line initialization.

With reference to the fourth aspect, in a first possible implementation manner, the first sending module is specifically configured to send, by using at least a third part of subcarriers of all the available subcarriers after receiving the first control signal, the first probe signal in the upstream direction, so that the central office end device in the upstream direction acquires the first crosstalk cancellation function, where the at least third part of subcarriers are any subcarriers of all the available subcarriers.

With reference to the fourth aspect, in a second possible implementation manner, the first part of subcarriers are a set of subcarriers whose center frequencies are not greater than a designated cutoff frequency in all the available subcarriers; and the terminal device further includes a first receiving module, configured to receive a first designation message carrying information about the designated cutoff frequency, to acquire a range of the first part of subcarriers.

With reference to the second possible implementation manner of the fourth aspect, in a third possible implementation manner, the first receiving module is specifically configured to receive the first designation message carrying information about a subcarrier sequence number threshold corresponding to the designated cutoff frequency, to acquire the range of the first part of subcarriers.

With reference to the fourth aspect, in a fourth possible implementation manner, the terminal device further includes a second receiving module, configured to receive a second designation message carrying information about a range of the at least second part of subcarriers, or receive a third designation message carrying information indicating that no limitation is set to: using the first part of subcarriers for sending the multiple data signals.

According to a fifth aspect of the present invention, another communication device is provided, including a transmitter, a processor, and a memory connected to the processor, where: the memory is configured to store data information needed in a line initialization process; the processor is configured to acquire, from the memory, a first probe signal in the data information, and control the transmitter to send the first probe signal in a downstream direction of an initializing line, to acquire a first precoding matrix needed by a first part of subcarriers of all available subcarriers; the processor is configured to acquire, from the memory, multiple data signals of all data signals that need to be sent in the data information, and control the transmitter to send the multiple data signals by using the first part of subcarriers; after the transmitter sends the multiple data signals by using the first part of subcarriers, the processor is configured to acquire, from the memory, a second probe signal in the data information, and control the transmitter to send, by using at least a second part of subcarriers of all the available subcarriers, the second probe signal to acquire a second precoding matrix needed by the at least second part of subcarriers; and the processor is further configured to acquire, from the memory, remaining data signals, exclusive of the multiple data signals, of all the data signals that need to be sent in the data information, and control the transmitter to send, by using the at least second part of subcarriers, the remaining data signals to complete line initialization.

Different from the prior art, the implementation manners of the present invention have the following beneficial effects: In the method for line initialization according to the present invention, first, a first precoding matrix needed by a first part of subcarriers of all available subcarriers is acquired; and after the first precoding matrix is acquired, multiple data signals of all data signals that need to be sent in an initialization process are sent by using only the first part of subcarriers of all the available subcarriers, and therefore, crosstalk caused by an initializing line to a transmitting line in the first part of subcarriers can be canceled by using the first precoding matrix. Furthermore, in the foregoing step, the multiple data signals are sent by using only the first part of subcarriers, and when the first part of subcarriers are preferably low-frequency subcarriers, it can be ensured that transmit power of the transmitting line is not apparently caused to exceed a limit when crosstalk cancellation processing is performed by using the first precoding matrix. In addition, a feedback channel, for feeding back a downstream error signal, of the initializing line is established in the process of sending the multiple data signals by using the first part of subcarriers. Therefore, after the multiple data signals are sent by using the first part of subcarriers, on a basis that the feedback channel is already established, a second precoding matrix needed by at least a second part of subcarriers can be acquired when a second probe signal is sent by using the at least second part of subcarriers, and remaining data signals, exclusive of the multiple data signals, of all the data signals that need to be sent in the initialization process, are sent by using the at least second part of subcarriers. Therefore, strong crosstalk caused by the initializing line to the transmitting line can be canceled by precoding processing of the second precoding matrix, without causing an apparent increase of the transmit power of the transmitting line.

DETAILED DESCRIPTION OF ILLUSTRATIVE EMBODIMENTS

In the following description, for the purpose of description rather than limitation, specific details about a specific system structure, an interface, a technology, and the like are provided, so that the present invention can be understood thoroughly. However, a person skilled in the art should be clear that the present invention may also be implemented in other implementation manners without these specific details. In other circumstances, detailed descriptions of commonly known apparatuses, circuits, and methods are omitted, so that the description of the present invention is not hindered by unnecessary details.

By using a VDSL2 system in a digital subscriber line technology as an example, in the VDSL2 (Very-high-bit-rate Digital Subscriber Line, very-high-bit-rate digital subscriber line) system, a channel is shared by all subscribers. Therefore, when all the subscribers are served simultaneously, each subscriber receives a signal needed by the subscriber, and also receives signals from other subscribers, that is, the subscribers interfere with each other. For near end crosstalk, because the VDSL2 system uses a frequency division multiplexing (FDM) modulation mode, a frequency band used by a signal sent by an interfering line pair is different from that used by a signal received by an interfered line pair, where the interfering line pair is a line pair that generates crosstalk to other line pairs, and the interfered line pair is a line pair that undergoes crosstalk interference from other line pairs. Therefore, near end crosstalk may be canceled or greatly reduced by using a filter. However, far end crosstalk cannot be canceled by using a filter. Therefore, a vectoring (vector precoding) technology may be used to effectively cancel far end crosstalk between various lines.

Figure 1:
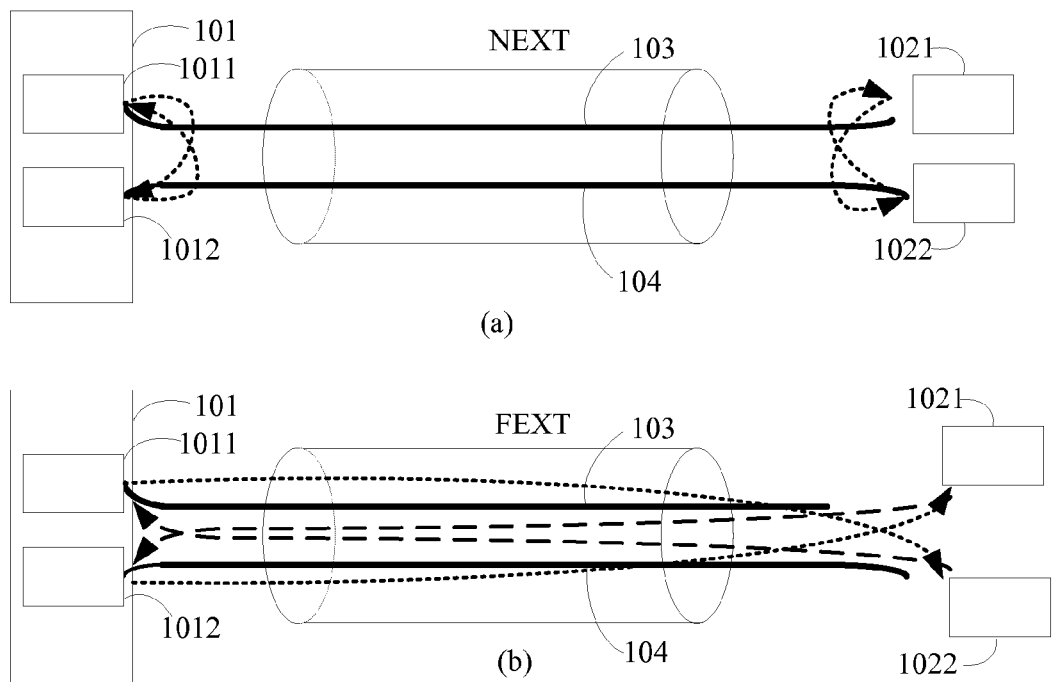
FIG. 1 is a schematic diagram of crosstalk generated in an xDSL system in the prior art.
Figure 2:
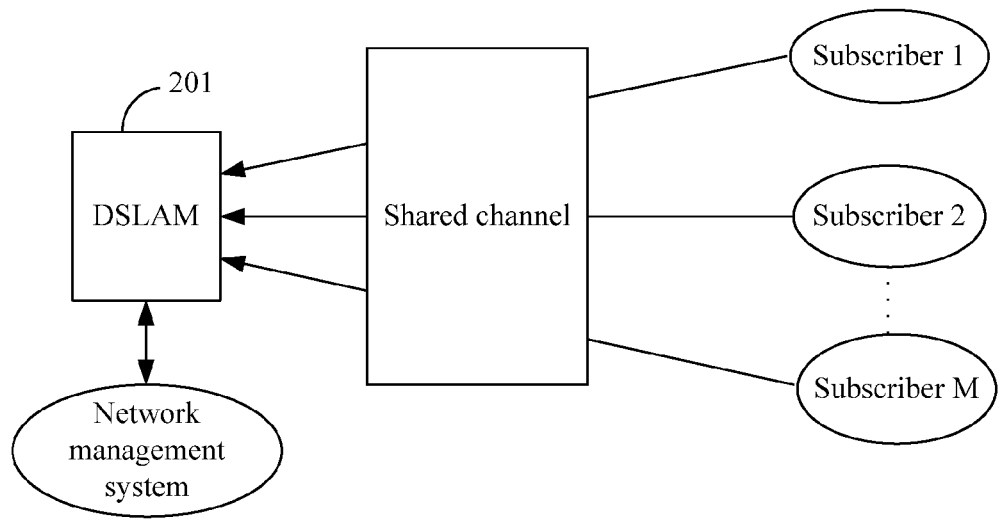
FIG. 2 is a schematic diagram showing that a VDSL2 system jointly receives signals at a DSLAM end to cancel crosstalk in the prior art.

A crosstalk cancellation principle of the vectoring technology is mainly as follows:

With reference to FIG. 2, in an upstream direction, a DSLAM (central office end) 201 jointly receives upstream signals sent by M subscribers, then extracts crosstalk signals from the received signals by using an upstream canceller, and then removes the crosstalk signals from the received signals, and therefore, far end crosstalk may be canceled.

Figure 3:
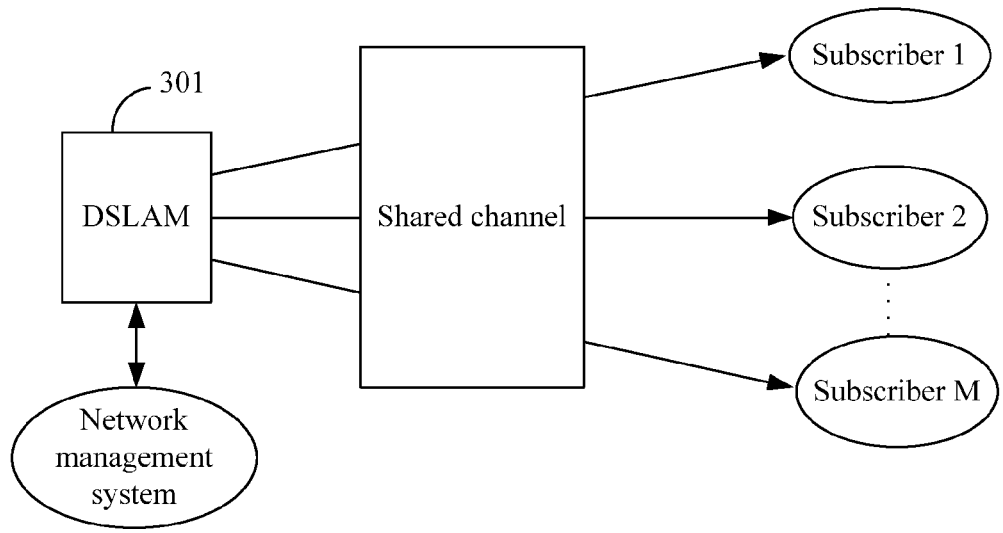
FIG. 3 is a schematic diagram showing that a VDSL2 system jointly sends signals at a DSLAM end to cancel crosstalk in the prior art.

With reference to FIG. 3, in a downstream direction, according to an agreement between a DSLAM 301 and M subscribers, a subscriber feeds back crosstalk information to the DSLAM 301, and then the DSLAM 301 uses a precoder to precode the crosstalk information into signals to be sent. That is, before the signals are sent, the signals to be sent and the crosstalk signals are precoded by the precoder, and signals to be sent and crosstalk signals that are acquired after being precoded are mutually canceled in a transmission process, so that a receive end receives correct signals approximately without crosstalk, and therefore, crosstalk cancellation is implemented.

Further, in the VDSL2 system, for M subscriber ends, a channel matrix H is an M×M channel transmission matrix, which may be expressed as:

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{M1} & h_{M2} & \cdots & h_{MM} \end{bmatrix}_{M \times M} \quad (1.1)$$

where $h_{ij}$ indicates a transmission equation from a line pair #j to a line pair #i, and may also be understood as crosstalk caused by the line pair #j to the line pair #i, for example, $h_{12}$ indicates crosstalk caused by a line pair #2 to a line pair #1, and $h_M = [h_{M1}, h_{M2}, \ldots, h_{MM}]$ indicates a subscriber channel corresponding to an $M^{th}$ subscriber end.

Assuming that x is an M×1 channel input vector (that is, a sent signal), and that y is an M×1 channel output vector (that is, a received signal), and that n is an M×1 noise vector, the channel transmission equation may be expressed as:

$$y = Hx + n \quad (1.2)$$

From the channel transmission equation, it may be known that a signal received by the receive end includes crosstalk signals from other lines. To cancel crosstalk, in the upstream direction, a crosstalk canceller W is introduced on the DSLAM side to perform joint reception processing on the received signal. In this case, a signal received by the DSLAM is:

$$\tilde{y} = Wy = WHx + Wn \quad (1.3)$$

When that WH is a diagonal matrix is satisfied, the introduced crosstalk canceller W eliminates the crosstalk signal received by the DSLAM.

In the downstream direction, a vector precoder P is introduced on the DSLAM side to perform joint transmission processing on the sent signal. All signals undergo precoding processing in the vector precoder P before being sent. In this case, the signal sent by the DSLAM is:

$$\tilde{x} = Px \quad (1.4)$$

Correspondingly, the signal received by the subscriber end is:

$$\tilde{y} = H\tilde{x} + n = HPx + n \quad (1.5)$$

When HP is a diagonal matrix, crosstalk between line pairs is canceled, and the subscriber end receives only a signal sent by a line pair of the subscriber end.

In the VDSL2 system, when a service is activated in a new line in a same bundle of cables, a line initialization process needs to be performed, but in the line initialization process, far end crosstalk is caused to other transmitting lines. A main objective of the present invention is to provide a method and a device for line initialization, which can cancel crosstalk between lines in a line initialization process while completing line initialization, and can reduce a probability that transmit power exceeds a limit.

Figure 4:
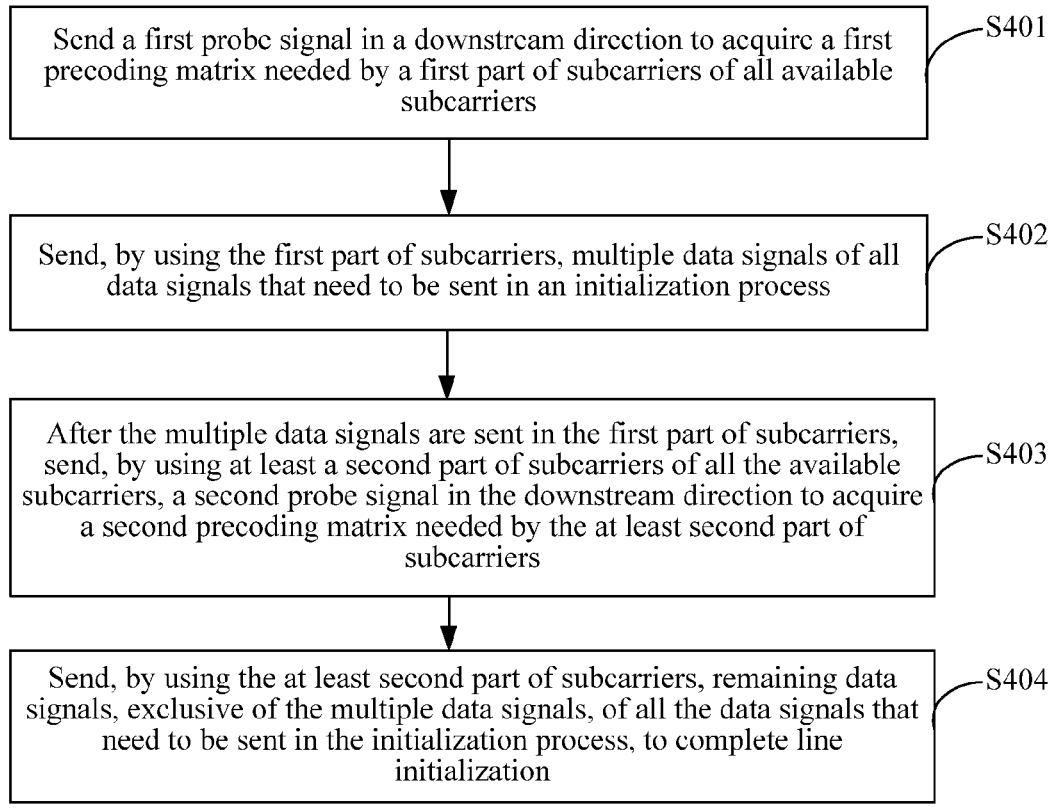
FIG. 4 is a flowchart of an implementation manner of a method for line initialization according to the present invention.

Referring to FIG. 4, FIG. 4 is a flowchart of an implementation manner of a method for line initialization according to the present invention. The method for line initialization in this implementation manner includes the following steps:

Step S401. Send a first probe signal in a downstream direction to acquire a first precoding matrix needed by a first part of subcarriers of all available subcarriers.

In this implementation manner, in the downstream direction, a line initialization process mainly includes two stages. A first stage is a stage from the start of the initialization process, until a feedback channel for a downstream error signal is established in the initialization process, that is, a stage from the start of the initialization process until a DSLAM can completely measure or calculate downstream crosstalk channels between all lines. Step S401 and step S402 shown in FIG. 4 are steps of the first stage. A second stage is a stage after the feedback channel, for the downstream error signal, of an initializing line is established and after step S402 is completed, until the initialization process is completed. Step S403 and step S404 shown in FIG. 4 are steps of the second stage. In the line initialization process, the initializing line causes crosstalk to other transmitting lines. To reduce a bit error rate of a transmitting line, the crosstalk needs to be canceled. At the first stage of the line initialization process, a linear precoding method is used in this implementation manner to cancel crosstalk caused by the initializing line to the transmitting line, and first, a precoding matrix is acquired when crosstalk cancellation is performed by using the linear precoding method.

Specifically, first the DSLAM sends the first probe signal to probe a downstream crosstalk channel from the initializing line to the transmitting line in the first part of subcarriers, and further, the DSLAM can calculate the first precoding matrix P needed by the first part of subcarriers. All the available subcarriers are recorded as a set, and the first part of subcarriers are a subset of all the available subcarriers, where the subset is neither an empty set, nor equal to the set of all the available subcarriers.

Further, when the DSLAM sends the first probe signal through the initializing line, a subscriber end device on the transmitting line not only receives subscriber signals of the subscriber end device, but also receives all crosstalk signals of each line, including a crosstalk signal caused by the first probe signal of the initializing line to the transmitting line. In this case, the subscriber end device on the transmitting line measures error signals of probe signals of all lines in the downstream direction, including the first probe signal of the initializing line, where the error signals indicate that the subscriber end device on the transmitting line receives all other crosstalk signals in addition to the subscriber signals of the subscriber end device, and feeds back the error signals to the DSLAM. After receiving the error signals fed back by the transmitting line, the DSLAM can calculate an error signal of the first probe signal, and calculate a downstream crosstalk channel (recorded as $H_{SJ}$) from the initializing line to the transmitting line according to the error signal of the first probe signal, and meanwhile, the DSLAM can also acquire a downstream crosstalk channel (recorded as $H_{SS}$) from the transmitting line to another transmitting line according to the error signal fed back by the transmitting line. At this stage, the initializing line does not have a capability of feeding back the downstream error signal yet. Therefore, the DSLAM cannot acquire a downstream crosstalk channel (recorded as $H_{JS}$) from the transmitting line to the initializing line and a downstream crosstalk channel (recorded as $H_{JJ}$) from the initializing line to another initializing line. Therefore, for a downstream channel transmission matrix:

$$H = \begin{pmatrix} H_{SS} & H_{SJ} \\ H_{JS} & H_{JJ} \end{pmatrix} \quad (1.6)$$

At the first stage of line initialization, only $H_{SJ}$ can be measured, and existing $H_{SS}$ is updated. By using $H_{JS}$ and $H_{SS}$, the DSLAM acquires the first precoding matrix P needed by the first part of subcarriers. Specifically, $D_S$=Diag ($H_{SS}$) is recorded, where $D_S$ is a diagonal matrix including $H_{SS}$ diagonal elements. Accordingly, the first precoding matrix P needed by the first part of subcarriers in the downstream direction at the first stage of line initialization may be acquired:

$$P = \begin{pmatrix} H_{SS}^{-1} D_S & -H_{SS}^{-1} H_{SJ} \\ 0 & I \end{pmatrix} \quad (1.7)$$

Step S402: Send, by using the first part of subcarriers, multiple data signals of all data signals that need to be sent in an initialization process.

When the DSLAM sends multiple data signals to a subscriber end device on the initializing line, crosstalk is caused to the transmitting line. After the first precoding matrix P needed by the first part of subcarriers is acquired, the DSLAM sends, with normal transmit power by using only the first part of subcarriers, the multiple data signals of all the data signals that need to be sent in the initialization process, to perform a line initialization process, where the data signals include data information such as symbols used for sending various messages and training parameters that are sent by the DSLAM to the subscriber end device in the line initialization process. In the process of sending the multiple data signals, the DSLAM establishes the feedback channel, for feeding back the downstream error signal, of the initializing line. In addition, in other available subcarriers, the DSLAM does not send any signal or sends signals with power far lower than normal transmit power, so that crosstalk is not caused to other lines as far as possible. By using the first precoding matrix P, the crosstalk caused by the initializing line to the transmitting line in the first part of subcarriers can be canceled. Specifically, on the DSLAM side, before a subscriber signal $x_S$ is sent on a sending port of the transmitting line, the subscriber signal $x_S$ first undergoes linear precoding processing with the first precoding matrix P, and therefore, a subscriber signal $\tilde{x}_s$ that has undergone precoding processing is sent to the subscriber end device. The subscriber signal $\tilde{x}_s$ that has undergone precoding processing is:

$$\tilde{x}_s = P x_s = \begin{pmatrix} H_{SS}^{-1} D_S & -H_{SS}^{-1} H_{SJ} \\ 0 & I \end{pmatrix} x_s \quad (1.8)$$

Therefore, after channel transmission, a subscriber signal $\tilde{y}_S$ received by the subscriber end device on the transmitting line is:

$$\begin{pmatrix} \tilde{y}_S \\ \tilde{y}_J \end{pmatrix} = H \cdot P \cdot \begin{pmatrix} x_S \\ x_J \end{pmatrix} + \begin{pmatrix} n_S \\ n_J \end{pmatrix} \quad (1.9)$$

$$= \begin{pmatrix} H_{SS} & H_{SJ} \\ H_{JS} & H_{JJ} \end{pmatrix} \cdot \begin{pmatrix} H_{SS}^{-1} D_S & -H_{SS}^{-1} H_{SJ} \\ 0 & I \end{pmatrix} \cdot \begin{pmatrix} x_S \\ x_J \end{pmatrix} + \begin{pmatrix} n_S \\ n_J \end{pmatrix}$$

$$= \begin{pmatrix} D_S & 0 \\ H_{SJ} H_{SS}^{-1} D_S & H_{JJ} - H_{JS} H_{SS}^{-1} H_{SJ} \end{pmatrix} \cdot \begin{pmatrix} x_S \\ x_J \end{pmatrix} + \begin{pmatrix} n_S \\ n_J \end{pmatrix}$$

$$= \begin{pmatrix} D_S x_S + n_S \\ H_{JS} H_{SS}^{-1} D_S x_S + (H_{JJ} - H_{JS} H_{SS}^{-1} H_{SJ}) x_J + n_J \end{pmatrix}$$

where $n_S$ and $n_J$ are respectively Gauss white noise of the transmitting line and the initializing line, and $\tilde{y}_J$ and $x_J$ are respectively a signal received by the subscriber end device on the initializing line and multiple data signals that are sent by the initializing line. It may be known from the foregoing equation that, the subscriber signal $\tilde{y}_S$ finally received by the subscriber end device on the transmitting line does not include a crosstalk signal from the initializing line. Therefore, the DSLAM performs precoding processing on the subscriber signal of the transmitting line according to the first precoding matrix, which can cancel crosstalk caused by the initializing line to the transmitting line in the first part of subcarriers, and reduce a bit error rate of the transmitting line.

In addition, at the first stage of the line initialization process, before the feedback channel, for feeding back the downstream error signal, of the initializing line is established, the multiple data signals of all the data signals that need to be sent in the initialization process are sent by using only the first part of subcarriers, while the first part of subcarriers are preferably low-frequency subcarriers, and occupy relatively low frequencies. In a frequency band of the used first part of subcarriers, crosstalk caused by low-frequency subcarriers is relatively weak, and crosstalk signals received by the transmitting line are far weaker than subscriber signals of the transmitting line, that is, $$\frac{|h_{ij}|}{|h_{ii}|} \ll 1, \forall i \neq j.$$

In this case, $$H_{SS}^{-1} D_S = (D_S^{-1} H_{SS})^{-1} = \quad (2.0)$$

$$\begin{pmatrix} 1 & \frac{h_{12}}{h_{11}} & \cdots & \frac{h_{1m}}{h_{11}} \\ \frac{h_{21}}{h_{22}} & 1 & \cdots & \frac{h_{2m}}{h_{22}} \\ \cdots & \cdots & \ddots & \cdots \\ \frac{h_{m1}}{h_{mm}} & \frac{h_{m2}}{h_{mm}} & \cdots & 1 \end{pmatrix}^{-1} \approx \begin{pmatrix} 1 & -\frac{h_{12}}{h_{11}} & \cdots & -\frac{h_{1m}}{h_{11}} \\ -\frac{h_{21}}{h_{22}} & 1 & \cdots & -\frac{h_{2m}}{h_{22}} \\ \cdots & \cdots & \ddots & \cdots \\ -\frac{h_{m1}}{h_{mm}} & -\frac{h_{m2}}{h_{mm}} & \cdots & 1 \end{pmatrix}$$

and

-continued $$H_{SS}^{-1} H_{SJ} = H_{SS}^{-1} D_S D_S^{-1} H_{SJ} \approx \qquad (2.1)$$

$$\begin{pmatrix} 1 & -\frac{h_{12}}{h_{11}} & \cdots & -\frac{h_{1m}}{h_{11}} \\ -\frac{h_{21}}{h_{22}} & 1 & \cdots & -\frac{h_{2m}}{h_{22}} \\ \cdots & \cdots & \ddots & \cdots \\ -\frac{h_{m1}}{h_{mm}} & -\frac{h_{m2}}{h_{mm}} & \cdots & 1 \end{pmatrix} \cdot \begin{pmatrix} \frac{h_{1,m+1}}{h_{11}} & \cdots & \frac{h_{1,n}}{h_{11}} \\ \cdots & \ddots & \cdots \\ \frac{h_{m,m+1}}{h_{mm}} & \cdots & \frac{h_{m,n}}{h_{mm}} \end{pmatrix}$$

After high-order elements are ignored, the following is acquired:

$$H_{SS}^{-1} H_{SJ} \approx \begin{pmatrix} \frac{h_{1,m+1}}{h_{11}} & \cdots & \frac{h_{1,n}}{h_{11}} \\ \cdots & \ddots & \cdots \\ \frac{h_{m,m+1}}{h_{mm}} & \cdots & \frac{h_{m,n}}{h_{mm}} \end{pmatrix} \qquad (2.2)$$

Therefore, the first precoding matrix P needed by the first part of subcarriers in the downstream direction is:

$$P = \begin{pmatrix} 1 & -\frac{h_{12}}{h_{11}} & \cdots & -\frac{h_{1m}}{h_{11}} & -\frac{h_{1,m+1}}{h_{11}} & \cdots & -\frac{h_{1n}}{h_{11}} \\ -\frac{h_{21}}{h_{22}} & 1 & \cdots & -\frac{h_{2m}}{h_{22}} & -\frac{h_{2,m+1}}{h_{22}} & \cdots & -\frac{h_{2n}}{h_{22}} \\ \cdots & \cdots & \ddots & \cdots & \cdots & \ddots & \cdots \\ -\frac{h_{m1}}{h_{mm}} & -\frac{h_{m2}}{h_{mm}} & \cdots & 1 & -\frac{h_{m,m+1}}{h_{mm}} & \cdots & -\frac{h_{mn}}{h_{mm}} \\ 0 & 0 & \cdots & 0 & 1 & \cdots & 0 \\ \cdots & \cdots & \ddots & \cdots & \cdots & \ddots & \cdots \\ 0 & 0 & \cdots & 0 & 0 & \cdots & 1 \end{pmatrix} \qquad (2.3)$$

After a subscriber signal $x_i$ sent by a port #i of an $i^{th}$ transmitting line on the DSLAM side is precoded with the precoding matrix P in the foregoing equation 2.3, a subscriber signal $\tilde{x}_i$ finally sent is approximately:

$$\tilde{x}_i \approx x_i - \sum_{j \neq i} \left( \frac{h_{i,j}}{h_{ii}} x_j \right) \qquad (2.4)$$

However, before precoding, original signals sent by all ports of the DSLAM are independent of each other. After the subscriber signal $x_i$ sent by the port #i of the $i^{th}$ transmitting line is precoded, it may be inferred according to a probability equation that transmit power of the port #i is:

$$E(|\tilde{x}_i|^2) \approx E(|x_i|^2) + \sum_{j \neq i} \left( \left| \frac{h_{i,j}}{h_{ii}} \right|^2 \cdot E(|x_j|^2) \right) \qquad (2.5)$$

Because $$\frac{|h_{i,j}|}{|h_{ii}|} \ll 1, \forall i \neq j, \left| \frac{h_{i,j}}{h_{ii}} \right|^2$$

is far less than 1. In this case, $$E(|\tilde{x}_i|^2) \approx E(|x_i|^2)$$

which indicates that the transmit power of the port #i of the $i^{th}$ transmitting line is not apparently increased after linear precoding.

Therefore, in this implementation manner, at the first stage of the line initialization process, in the downstream direction, the DSLAM sends, to the subscriber end device with normal transmit power by using only the first part of subcarriers of all the available subcarriers, the multiple data signals of all the data signals that need to be sent in the initialization process, and establishes, by using the process of sending the multiple data signals, the feedback channel, for feeding back the downstream error signal, of the initializing line; but does not send any signal or sends signals with power far lower than normal transmit power in other available subcarriers except the first part of subcarriers, to avoid crosstalk caused to other lines. A precoding technology in the foregoing step is linear precoding. When the multiple data signals are sent by the initializing line by using the first part of subcarriers, crosstalk caused by the initializing line to other transmitting lines may be canceled according to the first precoding matrix P of the first part of subcarriers. In addition, because the first part of subcarriers are low-frequency subcarriers, crosstalk signals from the initializing line to the transmitting line are relatively weak. Therefore, after linear precoding is performed on the subscriber signal sent by the transmitting line and the first precoding matrix P, transmit power of the port of the transmitting line is not increased dramatically.

Certainly, in addition to using the foregoing linear precoding method to cancel the crosstalk caused by the initializing line to the transmitting line, other precoding methods may also be used to perform crosstalk cancellation processing, which is not limited herein.

After the multiple data signals of all the data signals that need to be sent in the initialization process are sent by using the first part of subcarriers at the first stage, the line initialization process enters the second stage. The feedback channel, for feeding back the downstream error signal, of the initializing line is established in the process of sending the multiple data signals in the first part of subcarriers. It may be understood that, when the line initialization process enters the second stage, the initializing line already has the capability of feeding back the downstream error signal.

Step S403: After the multiple data signals are sent by using the first part of subcarriers, send, by using at least a second part of subcarriers of all the available subcarriers, a second probe signal in the downstream direction to acquire a second precoding matrix needed by the at least second part of subcarriers.

At the first stage of the line initialization process, because the multiple data signals that need to be sent in the initialization process are sent by using only the first part of subcarriers of all the available subcarriers, only the crosstalk caused by the initializing line to the transmitting line in the first part of subcarriers is canceled. To reduce a risk of bit errors caused to the transmitting line due to incomplete crosstalk cancellation in other subcarriers, crosstalk signals from the initializing line to the transmitting line in the other subcarriers need to be canceled. At the second stage of the line initialization process, the second probe signal is sent in the downstream direction by using at least the second part of subcarriers, and further, the second precoding matrix needed by the at least second part of subcarriers is acquired to perform crosstalk cancellation. The at least second part of subcarriers are a set of any subcarriers of all the available subcarriers, for example, may be a subset completely or partly including the first part of subcarriers, or may be a set of other subcarriers except the first part of subcarriers, or may be the set of all the available subcarriers. Specifically, selection may be made according to an actual situation. Preferably, in this implementation manner, all the available subcarriers are used to send the second probe signal to acquire the second precoding matrix needed by all the available subcarriers.

After the feedback channel, for feeding back the downstream error signal, of the initializing line is established, and after the multiple data signals are sent by using the first part of subcarriers, the DSLAM sends the second probe signal by using all the available subcarriers. The subscriber end device on the transmitting line measures an error signal corresponding to crosstalk caused by the second probe signal of the initializing line to a probe signal of the transmitting line, and feeds back the error signal to the DSLAM. After receiving the error signal fed back by the transmitting line, the DSLAM can calculate an error signal of the second probe signal, and calculate, according to the error signal of the second probe signal, a downstream crosstalk channel from the initializing line to the transmitting line in all the available subcarriers. In addition, because the initializing line has the capability of feeding back the downstream error signal, the DSLAM may acquire all downstream crosstalk channels in the downstream direction, so as to acquire, according to all the downstream crosstalk channels, the second precoding matrix needed by all the available subcarriers. Specifically, a calculation process may be performed with reference to the foregoing step, and no further description is provided herein.

Step S404: Send, by using the at least second part of subcarriers, remaining data signals, exclusive of the multiple data signals, of all the data signals that need to be sent in the initialization process, to complete line initialization.

After acquiring the second precoding matrix needed by all the available subcarriers, the DSLAM may send, to the subscriber end device in the downstream direction of the initializing line and on the initializing line by using all the available subcarriers, the remaining data signals, exclusive of the multiple data signals, of all the data signals that need to be sent in the initialization process, to complete the line initialization process. In this case, by using the second precoding matrix, precoding processing is performed on a subscriber signal that is sent by using the transmitting line, and crosstalk caused by the initializing line to the transmitting line in all the available subcarriers can be canceled. In all the available subcarriers, the crosstalk caused by the initializing line to the transmitting line in the first part of subcarriers has been canceled by using the first precoding matrix at the first stage. For other subcarriers except the first part of subcarriers, and in particular, for high-frequency subcarriers, strong crosstalk may be caused to other transmitting lines when the remaining data signals are sent by using the initializing line and the high-frequency subcarriers. To avoid that the strong crosstalk causes the transmit power of the transmitting line to exceed a limit, in this implementation manner, on a basis that the DSLAM has already acquired all the downstream crosstalk channels, a nonlinear precoding method is used for precoding processing of the subscriber signal that is sent by using the transmitting line, and the second precoding matrix, for example, THP (Tomlinson-Harashima-Precoding, Tomlinson-Ha-rashima-precoding) in nonlinear precoding may be used to perform precoding processing. By means of nonlinear precoding processing, the transmit power of the transmitting line may be controlled not to easily exceed the limit, and meanwhile, the crosstalk caused by the initializing line to the transmitting line in all the available subcarriers, including strong crosstalk caused by the initializing line to the transmitting line in the high-frequency subcarriers, can also be canceled. Certainly, in other implementation manners, strong crosstalk cancellation processing on signals may also be performed by using other nonlinear precoding methods, without being limited to the forgoing THP precoding method. Specifically, selection may be made according to an actual situation.

In addition, because the feedback channel, for the downstream error signal, of the initializing line is already established, so that the DSLAM can acquire the downstream crosstalk channel from the transmitting line to the initializing line and the downstream crosstalk channel from the initializing line to another initializing line, and therefore can also cancel crosstalk caused by the transmitting line to the initializing line in all the available subcarriers. That is, after the feedback channel, for the downstream error signal, of the initializing line is established, the DSLAM can perform cancellation processing of crosstalk between all lines by performing precoding processing.

It should be noted that, after acquiring the second precoding matrix, the DSLAM acquires a range of all the available subcarriers. Preferably, the DSLAM acquires a message carrying the range of all the available subcarriers, and notifies the subscriber end device on the initializing line in the downstream direction of the range of all the available subcarriers by using the message. In another implementation manner, the DSLAM may also not notify the subscriber end device on the initializing line of the range of all the available subcarriers, but notifies, by using a message, the subscriber end device on the initializing line that the subscriber end device is no longer limited to using the first part of subcarriers for sending the multiple data signals. After the second precoding matrix is acquired, the remaining data signals, exclusive of the multiple data signals, of all the data signals that need to be sent in the line initialization process are sent to the subscriber end device on the initializing line with normal transmit power by using all the available subcarriers, to complete the line initialization process.

Certainly, the DSLAM may also not send the foregoing notification message to the subscriber end device on the initializing line, but sends the remaining data signals by directly using all the available subcarriers after the feedback channel for the initializing line is established and after the second precoding matrix is acquired, to complete line initialization, unlike sending the data signals by using only the first part of subcarriers at the first stage.

By using the foregoing manner, in the line initialization process in this implementation manner, before the feedback channel, for feeding back the downstream error signal, of the initializing line is established, the multiple data signals of all the data signals that need to be sent in the initialization process are sent to the subscriber end device on the initializing line with normal transmit power by using only the first part of subcarriers, so that the crosstalk caused by the initializing line to other transmitting lines is relatively weak, and further, when linear precoding is performed, by using the first precoding matrix, on the subscriber signal sent by using the transmitting line in the downstream direction, to cancel the crosstalk caused by the initializing line to the transmitting line in the first part of subcarriers, the transmit power of the transmitting line is not caused to exceed limit dramatically. After the multiple data signals are sent by using the first part of subcarriers, the feedback channel, for feeding back the downstream error signal, of the initializing line is established, and the DSLAM may acquire downstream crosstalk channels between all lines. Therefore, when the remaining data signals are sent to the subscriber end device on the initializing line by using all the available subcarriers, to complete the line initialization process, strong crosstalk caused by the initializing line to the transmitting line in other high-frequency subcarriers except the first part of subcarriers can be canceled by performing nonlinear precoding on the second precoding matrix and the subscriber signal sent by using the transmitting line in the downstream direction, without causing the transmit power of the port of the transmitting line to exceed the limit apparently.

In another implementation manner of the method for line initialization, the step of sending a first probe signal in a downstream direction to acquire a first precoding matrix needed by a first part of subcarriers of all available subcarriers is specifically as follows: sending, by using at least a third part of subcarriers, the first probe signal in the downstream direction to acquire the first precoding matrix.

The at least third part of subcarriers are any subcarriers of all the available subcarriers, for example, may completely or partly include the first part of subcarriers, or may not include the first part of subcarriers, or may be all the available subcarriers. Specifically, selection may be made according to an actual situation.

In this implementation manner, preferably, the at least third part of subcarriers are the first part of subcarriers, that is, in the downstream direction, the DSLAM sends the first probe signal with normal power by directly using the first part of subcarriers, but does not send any signal or sends signals with power far lower than the normal power in other available subcarriers except the first part of subcarriers, so that crosstalk is not caused to other lines as far as possible. After the first probe signal is sent by using the initializing line, the subscriber end device on the transmitting line measures the error signal of the first probe signal, and feeds back the error signal to the DSLAM. The DSLAM calculates, according to the error signal of the first probe signal, the downstream crosstalk channel from the initializing line to the transmitting line in the first part of subcarriers, and further acquires the first precoding matrix according to the downstream crosstalk channel.

In other implementation manners, when the at least third part of subcarriers are other subcarriers, in the downstream direction, the DSLAM sends the first probe signal by using the other subcarriers. In this case, the subscriber end device on the transmitting line measures the error signal of the first probe signal, and feeds back the first error signal to the DSLAM. After receiving the first error signal, which is fed back by the subscriber end device on the transmitting line, of the first probe signal, the DSLAM calculates, according to the first error signal, the downstream crosstalk channel from the initializing line to the transmitting line in the other subcarriers, so as to estimate, according to the downstream crosstalk channel from the initializing line to the transmitting line in the other subcarriers, the downstream crosstalk channel from the initializing line to the transmitting line in the first part of subcarriers, and further acquires the first precoding matrix needed by the first part of subcarriers.

Figure 5:
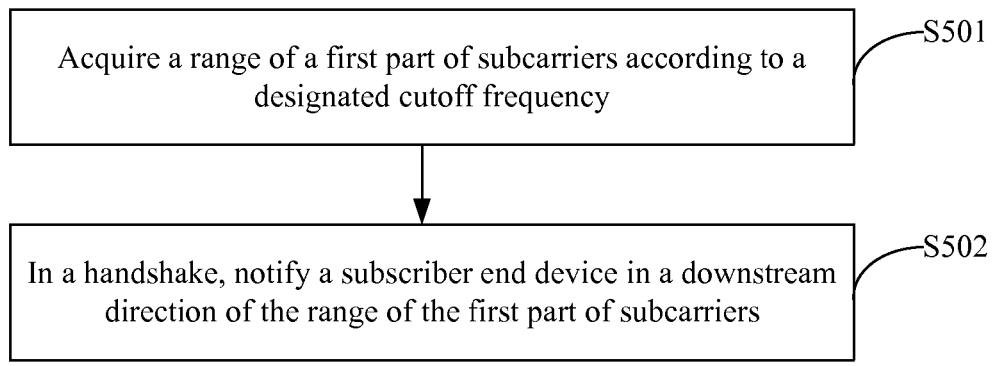
FIG. 5 is a flowchart of another implementation manner of a method for line initialization according to the present invention before multiple data signals of all data signals that need to be sent in an initialization process are sent by using a first part of subcarriers.

Referring to FIG. 5, FIG. 5 is a flowchart of another implementation manner of a method for line initialization according to the present invention before multiple data signals of all data signals that need to be sent in an initialization process are sent by using a first part of subcarriers. Specifically, the method includes the following steps:

Step S501: Acquire a range of a first part of subcarriers according to a designated cutoff frequency.

During signal transmission, with an increase of frequencies of subcarriers, crosstalk becomes severer. Therefore, before a feedback channel, for a downstream error signal, of an initializing line is established, to avoid strong crosstalk caused by the initializing line to other lines and avoid that the strong crosstalk causes transmit power of ports of the other lines to exceed a limit when linear precoding is used, the first part of subcarriers are preferably low-frequency subcarriers. The first part of subcarriers are represented by the cutoff frequency, that is, the first part of subcarriers are a set of subcarriers whose center frequencies are not greater than the designated cutoff frequency in all available subcarriers. Preferably, the designated cutoff frequency is lower than 30 MHz, that is, that is, the range of the first part of subcarriers.

In a line initialization process, the frequency range of the first part of subcarriers may be determined by a DSLAM, or may be determined by a subscriber end device on the initializing line in the downstream direction, or may be determined by negotiation by a DSLAM and a subscriber end device on the initializing line. Because the DSLAM has more comprehensive information about all lines, preferably, in this implementation manner, the range of the first part of subcarriers is determined by the DSLAM.

Step S502: In a handshake, notify a subscriber end device in a downstream direction of the range of the first part of subcarriers.

When the DSLAM establishes a connection with the subscriber end device on the initializing line, the DSLAM notifies the subscriber end device on the initializing line of the range of the first part of subcarriers by using a message, to avoid that in a subsequent process, the subscriber end device receives only signals sent in the first part of subcarriers and does not receive signals sent in other available subcarriers. In this implementation manner, the range of the first part of subcarriers is the set of subcarriers whose center frequencies are not greater than the designated cutoff frequency. Therefore, the DSLAM notifies the subscriber end device on the initializing line of information about the center frequencies of the first part of subcarriers by using a message, so that the subscriber end device learns the range of the first part of subcarriers.

In another implementation manner, the DSLAM may also select to notify, by using a first data signal, the subscriber end device on the initializing line of the range of the first part of subcarriers after a handshake is completed and when the first data signal of multiple data signals is sent to the subscriber end device on the initializing line by using the first part of subcarriers. In addition, the first part of subcarriers may also be represented by subcarrier sequence numbers, and the DSLAM may further acquire the range of the first part of subcarriers according to a subcarrier sequence number corresponding to the designated cutoff frequency, that is, the first part of subcarriers are a set of subcarriers whose subcarrier sequence numbers are not greater than a subcarrier sequence number threshold in all the available subcarriers.

Figure 6:
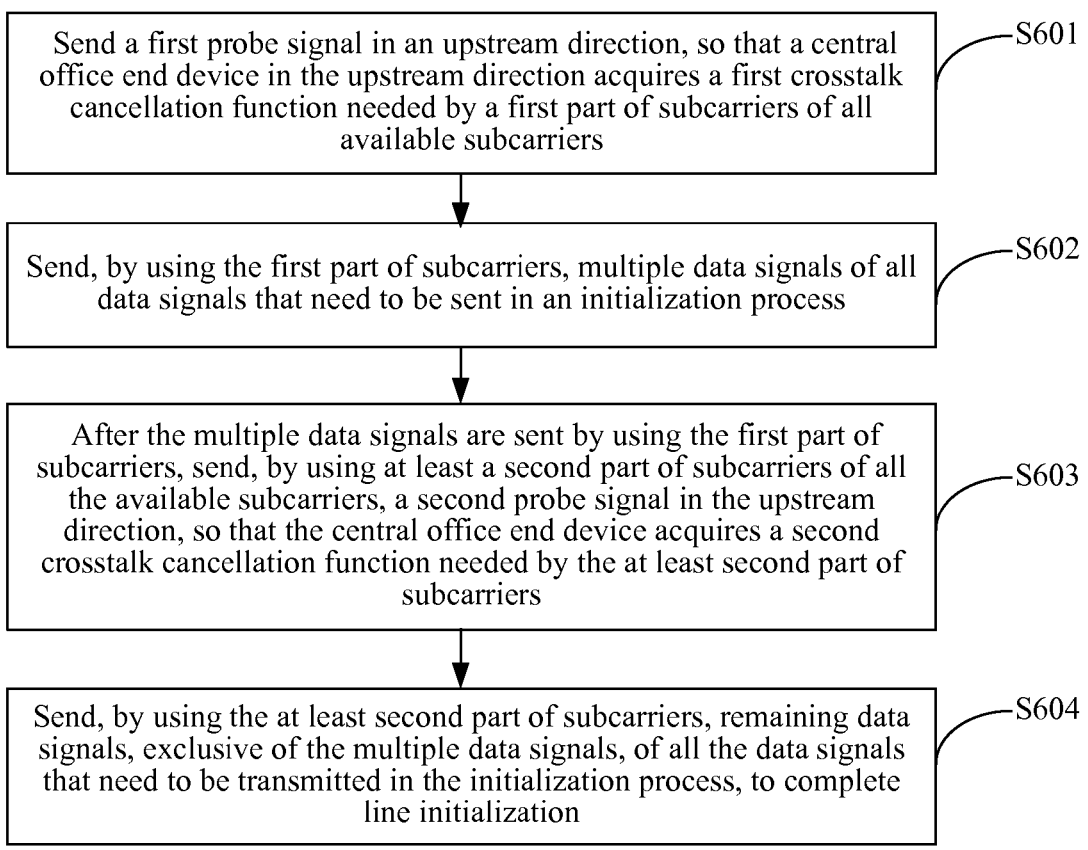
FIG. 6 is a flowchart of still another implementation manner of a method for line initialization according to the present invention.

Referring to FIG. 6, FIG. 6 is a flowchart of still another implementation manner of a method for line initialization according to the present invention. The method includes the following steps:

Step S601: Send a first probe signal in an upstream direction, so that a central office end device in the upstream direction acquires a first crosstalk cancellation function needed by a first part of subcarriers of all available subcarriers.

In the upstream direction, the central office end device jointly receives signals sent by subscriber end devices on various lines, to perform crosstalk cancellation processing.

In the upstream direction, in a line initialization process, when a feedback channel, for an upstream error signal, of an initializing line is not established, that is, when the central office end device cannot completely measure, estimate, or calculate upstream crosstalk channels between all lines, or when the central office end device cannot correctly measure the error signal in the upstream direction of the initializing line, a subscriber end device on the initializing line sends the first probe signal to the central office end device. In this case, a transmitting line undergoes crosstalk caused by the initializing line. The central office end device not only receives a subscriber signal of the transmitting line, but also receives the crosstalk caused by the initializing line to the transmitting line. By processing the crosstalk, the central office end device measures an error signal of the first probe signal. The central office end device calculates, according to the error signal, an upstream crosstalk channel from the initializing line to the transmitting line in the first part of subcarriers, so as to acquire, according to the upstream crosstalk channel, the first crosstalk cancellation function needed by the first part of subcarriers.

All the available subcarriers are recorded as a set, and the first part of subcarriers are a subset in the set of all the available subcarriers, where the subset is neither an empty set, nor equal to the set of all the available subcarriers.

Step S602: Send, by using the first part of subcarriers, multiple data signals of all data signals that need to be sent in an initialization process.

After the central office end device acquires the first crosstalk cancellation function needed by the first part of subcarriers, the subscriber end device on the initializing line sends, to the central office end device with normal transmit power by using only the first part of subcarriers, the multiple data signals of all the data signals that need to be sent in the initialization process, where the data signals include data information such as symbols used for sending various messages and training parameters that need to be sent to the central office end device in the line initialization process. In the process of sending the multiple data signals by using the first part of subcarriers, the central office end device acquires a capability of correctly parsing the upstream error signal of the initializing line, or establishes the feedback channel, for feeding back the upstream error signal, of the initializing line. Because the central office end device has acquired the first crosstalk cancellation function needed by the first part of subcarriers, when receiving the subscriber signal of the transmitting line, the central office end device performs crosstalk cancellation processing by using the subscriber signal of the transmitting line and the first crosstalk cancellation function. Therefore, the crosstalk caused to the transmitting line by the initializing line when the data signals are sent in the first part of subcarriers can be canceled, the subscriber signal of the transmitting line finally received by the central office end device does not include a crosstalk signal from the initializing line, and a bit error rate of the transmitting line is reduced.

In addition, in other available subcarriers except the first part of subcarriers, the subscriber end device on the initializing line does not send any signal or sends signals with power far lower than normal transmit power, so that strong crosstalk is not caused to other transmitting lines as far as possible.

Step S603: After the multiple data signals are sent by using the first part of subcarriers, send, by using at least a second part of subcarriers of all the available subcarriers, a second probe signal in the upstream direction, so that the central office end device acquires a second crosstalk cancellation function needed by the at least second part of subcarriers.

After the feedback channel, for feeding back the upstream error signal, of the initializing line is established, or after the central office end device has the capability of correctly measuring the upstream error signal of the initializing line, and after the multiple data signals are sent by using the first part of subcarriers, before the subscriber end device on the initializing line sends the second probe signal by using the at least second part of subcarriers, the central office end device first notifies the subscriber end device on the initializing line of a range of the at least second part of subcarriers. In this case, the subscriber end device receives a second designation message that carries information about the range of the at least second part of subcarriers and that is sent by the central office end device, and learns the range of the at least second part of subcarriers according to the second designation message, and therefore can send the second probe signal by using the at least second part of subcarriers, and can also send remaining data signals exclusive of the multiple data signals by using the at least second part of subcarriers in a subsequent process. In another implementation manner, before the subscriber end device on the initializing line sends the second probe signal by using the at least second part of subcarriers, the central office end device may also not notify the subscriber end device of the range of the at least second part of subcarriers, but notifies the subscriber end device that the subscriber end device is no longer limited to using the first part of subcarriers for sending the multiple data signals. In this case, the subscriber end device receives a third designation message carrying information indicating that no limitation is set to: using the first part of subcarriers for sending the multiple data signals, and the subscriber end device sends, according to the third designation message, the second probe signal and the remaining data signals by using the at least second part of subcarriers.

The at least second part of subcarriers are a set of any subcarriers of all the available subcarriers, for example, may completely or partly include the first part of subcarriers, or may not include the first part of subcarriers, or may be all the available subcarriers. By receiving the second probe signal, the central office end device can calculate an error signal of the second probe signal, and acquire, according to the error signal, an upstream crosstalk channel from the initializing line to the transmitting line in the at least second part of subcarriers. Because the central office end device has established the feedback channel, for the upstream error signal, of the initializing line, or has the capability of correctly parsing the error signal in the upstream direction of the initializing line, the central office end device can acquire an upstream crosstalk channel from the transmitting line to the initializing line. At this stage, the central office end device can acquire all upstream crosstalk channels, so as to calculate, according to all the upstream crosstalk channels, the second crosstalk cancellation function needed by the at least second part of subcarriers.

Step S604: Send, by using the at least second part of subcarriers, remaining data signals, exclusive of the multiple data signals, of all the data signals that need to be sent in the initialization process, to complete line initialization.

When the subscriber end device on the initializing line sends the remaining data signals by using the at least second part of subcarriers, crosstalk may also be caused to the transmitting line. After acquiring the second crosstalk cancellation function needed by the at least second part of subcarriers of all the available subcarriers, when receiving a subscriber signal of the transmitting line, the central office end device performs crosstalk cancellation processing by using the subscriber signal of the transmitting line and the second crosstalk cancellation function. Therefore, the crosstalk caused to the transmitting line by the initializing line when the remaining data signals are sent in the at least second part of subcarriers is canceled, and the subscriber signal of the transmitting line finally received by the central office end device does not include a crosstalk signal from the initializing line.

In addition, because the feedback channel, for the upstream error signal, of the initializing line is already established, or the central office end device already has the capability of correctly parsing the upstream error signal of the initializing line, the initializing line can feed back the upstream error signal. Therefore, the central office end device can acquire the upstream crosstalk channel from the transmitting line to the initializing line and an upstream crosstalk channel from the initializing line to another initializing line, and can further perform cancellation processing of crosstalk caused by the transmitting line to the initializing line.

By using the foregoing manner, in the method for line initialization in this implementation manner, before the feedback channel, for feeding back the upstream error signal, of the initializing line is established, or before the central office end device has the capability of correctly parsing the upstream error signal of the initializing line, the subscriber end device on the initializing line sends, with normal transmit power by using only the first part of subcarriers of all the available subcarriers, the multiple data signals of all the data signals that need to be sent in the initialization process, but does not send any signal or sends signals with power far lower than normal transmit power in other available subcarriers, so that strong crosstalk is not caused to other lines. In addition, the crosstalk caused by the initializing line to the transmitting line in the first part of subcarriers can be canceled by using the first crosstalk cancellation function. After the central office end device establishes the feedback channel, for the upstream error signal, of the initializing line or has the capability of correctly parsing the upstream error signal of the initializing line, and after the multiple data signals are sent by using the first part of subcarriers, the subscriber end device on the initializing line sends the second probe signal by using the at least second part of subcarriers. On a basis that the feedback channel, for the upstream error signal, of the initializing line is already established or that the central office end device has the capability of correctly parsing the upstream error signal of the initializing line, the central office end device can acquire all upstream crosstalk channels to calculate the second crosstalk cancellation function, and therefore can cancel the crosstalk caused by the initializing line to the transmitting line in the at least second part of subcarriers when the remaining data signals are sent by using the at least second part of subcarriers.

In still another implementation manner of the method for line initialization according to the present invention, the step of sending a first probe signal in an upstream direction, so that a central office end device acquires a first crosstalk cancellation function needed by a first part of subcarriers of all available subcarriers includes: sending, by using at least a third part of subcarriers, the first probe signal in the upstream direction, so that the central office end device in the upstream direction acquires the first crosstalk cancellation function.

The at least third part of subcarriers are any subcarriers of all the available subcarriers, and may partly or completely include the first part of subcarriers, or may not include the first part of subcarriers, or may be all the available subcarriers. Specifically, selection may be made according to an actual situation. Preferably, in this implementation manner, the at least third part of subcarriers are the first part of subcarriers, that is, the subscriber end device on the initializing line sends the first probe signal to the central office end device by using only the first part of subcarriers. Therefore, the central office end device can acquire a first error signal of the first probe signal, and the central office end device calculates, according to the first error signal, an upstream crosstalk signal from the initializing line to the transmitting line in the first part of subcarriers, and further acquires the first crosstalk cancellation function needed by the first part of subcarriers.

In other implementation manners, the at least third part of subcarriers are other subcarriers, that is, the subscriber end on the initializing line is not limited to using only the first part of subcarriers for sending the first probe signal, but sends the first probe signal to the central office end device by using other subcarriers, for example, sends the first probe signal to the central office end device by using other subcarriers that does not include the first part of subcarriers or other subcarriers that include only the first part of subcarriers. In this case, after receiving the first probe signal, the central office end device can acquire a first error signal of the first probe signal, and acquire, according to the first error signal, an upstream crosstalk channel from the initializing line to the transmitting line in the other subcarriers, so as to estimate, according to the upstream crosstalk channel from the initializing line to the transmitting line in the other subcarriers, the upstream crosstalk channel from the initializing line to the transmitting line in the first part of subcarriers, and further acquire the first crosstalk cancellation function needed by the first part of subcarriers.

In still another implementation manner of the method for line initialization according to the present invention, the first part of subcarriers are a set of subcarriers whose center frequencies are not greater than a designated cutoff frequency in all the available subcarriers, where the designated cutoff frequency is preferably lower than 30 MHz, that is, a range of the first part of subcarriers is not greater than 30 MHz. Because of relatively low frequencies, before the feedback channel for the upstream error signal is established, strong crosstalk is not caused to other transmitting lines when the subscriber end device on the initializing line sends the multiple data signals to the central office end device by using the first part of subcarriers.

In this implementation manner, before the step of sending a first probe signal in an upstream direction, so that a central office end device in the upstream direction acquires a first crosstalk cancellation function needed by a first part of subcarriers of all available subcarriers, that is, before the subscriber end device sends all the signals in the line initialization process in the upstream direction, the method includes the following step: receiving a first designation message carrying information about the designated cutoff frequency, to acquire the range of the first part of subcarriers.

The first part of subcarriers are preferably low-frequency subcarriers. In the line initialization process, the range of the first part of subcarriers may be determined by the central office end device, or may be determined by the subscriber end device on the initializing line, or may be determined by negotiation by the central office end device and the subscriber end device. Because the central office end device has more comprehensive information about all lines, preferably, in this implementation manner, the range of the first part of subcarriers is determined by the central office end device. Before the subscriber end device on the initializing line sends all the signals, the central office end device first notifies the subscriber end device of the range of the first part of subcarriers, to notify that the subscriber end device needs to send the first probe signal, the data signals, and the like by using the first part of subcarriers. The central office end device determines the range of the first part of subcarriers according to the designated cutoff frequency, and notifies the subscriber end device of the range of the first part of subcarriers by using the first designation message, for example, a G.993.5 O-SIGNATURE message, so that before the feedback channel for the upstream error signal is established or before the central office end device has the capability of correctly parsing the upstream error signal, the subscriber end device sends the multiple data signals by using only the first part of subcarriers. Further, in a handshake between the central office end device and the subscriber end device on the initializing line, the central office end device notifies the subscriber end device of the range of the first part of subcarriers.

Certainly, in another implementation manner, during initialization after the handshake is completed, the central office end device notifies the subscriber end device of the range of the first part of subcarriers by using the first designation message before the subscriber end device on the initializing line sends all the signals in the initialization process. In addition, the range of the first part of subcarriers may also be determined by the central office end device by using a subcarrier sequence number threshold corresponding to the designated cutoff frequency. The central office end device notifies the subscriber end of the range of the first part of subcarriers by using the first designation message. The subscriber end device receives the first designation message carrying information about the subcarrier sequence number threshold corresponding to the designated cutoff frequency, so as to learn the range of the first part of subcarriers. Therefore, before the feedback channel for the upstream error signal is established or before the central office end device has the capability of correctly parsing the upstream error signal, the multiple data signals of all the data signals that need to be sent in the initialization process are sent by using only the first part of subcarriers.

Figure 7:
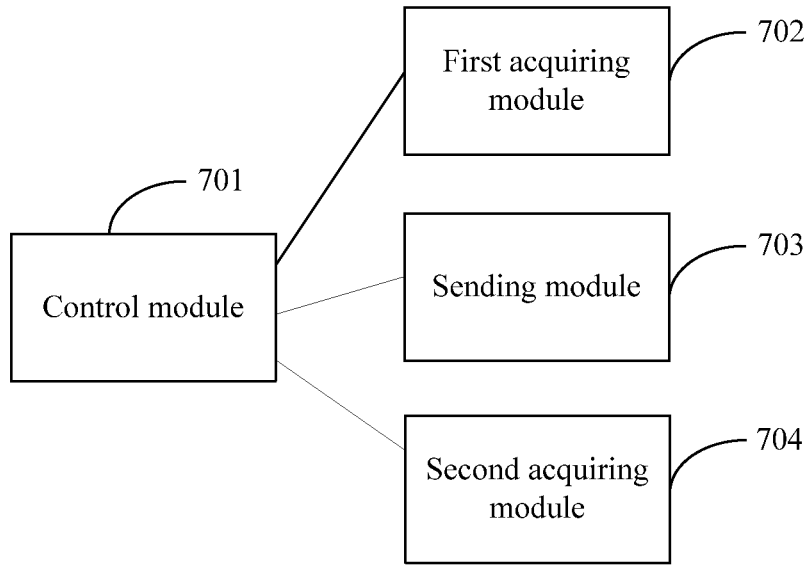
FIG. 7 is a schematic structural diagram of an implementation manner of a communication device according to the present invention.

Referring to FIG. 7, FIG. 7 is a schematic structural diagram of an implementation manner of a communication device according to the present invention. The communication device in this implementation manner includes a control module 701, a first acquiring module 702, a sending module 703, and a second acquiring module 704.

In a line initialization process, before a feedback channel, for a downstream error signal, of an initializing line is established, the control module 701 is configured to send a first control signal to the first acquiring module 702, to control the first acquiring module 702 to acquire a first precoding matrix. The first acquiring module 702 is configured to send, after receiving the first control signal, a first probe signal in the downstream direction of the initializing line, to acquire the first precoding matrix needed by a first part of subcarriers of all available subcarriers. Specifically, after the first acquiring module 702 sends the first probe signal, a subscriber end device on a transmitting line can measure an error signal of the first probe signal and feed back the error signal to the first acquiring module 702. The first acquiring module 702 calculates, according to the error signal fed back by the subscriber end device on the transmitting line, a downstream crosstalk channel from the initializing line to the transmitting line in the first part of subcarriers, and further acquires the first precoding matrix needed by the first part of subcarriers.

After acquiring the first precoding matrix, the first acquiring module 702 notifies the control module 701 that acquisition of the first precoding matrix is completed. In this case, the control module 701 is configured to send a second control signal to the sending module 703. The sending module 703 sends, with normal transmit power by using the first part of subcarriers after receiving the second control signal, multiple data signals of all data signals that need to be sent in the line initialization process to perform line initialization, where the feedback channel, for feeding back the downstream error signal, of the initializing line is established in a process of sending the multiple data signals. However, in other available subcarriers except the first part of subcarriers, the sending module 703 does not send any signal or sends signals with power far lower than normal transmit power, to avoid strong crosstalk caused to other transmitting lines. In this implementation manner, the data signals include data information such as symbols used for sending messages and training parameters that need to be sent in the line initialization process. When the sending module 703 sends the multiple data signals by using the first part of subcarriers, crosstalk is caused to other transmitting lines. However, crosstalk caused by the initializing line to the transmitting line in the first part of subcarriers can be canceled by using the first precoding matrix. Therefore, a subscriber signal finally received by the subscriber end device on the transmitting line does not include a crosstalk signal from the initializing line. In addition, the first part of subcarriers are preferably low-frequency subcarriers. When the multiple data signals are sent by using the first part of subcarriers, strong crosstalk is not caused to the transmitting line. Therefore, when crosstalk caused by the initializing line to the transmitting line in the first part of subcarriers is canceled by using the first precoding matrix, transmit power of a port of the transmitting line is not easily caused to exceed a limit.

After the feedback channel, for feeding back the downstream error signal, of the initializing line is established and after the sending module 703 sends the multiple data signals by using the first part of subcarriers, the control module 701 is configured to send a third control signal to the second acquiring module 704, and the second acquiring module 704 is configured to send, by using at least a second part of subcarriers of all the available subcarriers after receiving the third control signal, a second probe signal in the downstream direction of the initializing line, to acquire a second precoding matrix needed by the at least second part of subcarriers. On a basis that the feedback channel, for feeding back the downstream error signal, of the initializing line is established, the second acquiring module can acquire all downstream crosstalk channels and further acquire the second precoding matrix. After acquiring the second precoding matrix, the second acquiring module 704 notifies the control module 701 that acquisition of the second precoding matrix is completed. In this case, the control module 701 is configured to send a fourth control signal to the sending module

703. The sending module 703 is further configured to send, by using the at least second part of subcarriers after receiving the fourth control signal, remaining data signals, exclusive of the multiple data signals, of all the data signals that need to be sent in the initialization process, to complete line initialization. The at least second part of subcarriers are a set of any subcarriers of all the available subcarriers, for example, may be a set of subcarriers completely or partly including the first part of subcarriers, or may be a set of other subcarriers except the first part of subcarriers, or may be a set of all the available subcarriers. Specifically, selection may be made according to an actual situation. Preferably, in this implementation manner, the sending module 703 sends the remaining data signals by using all the available subcarriers after receiving the fourth control signal.

For the transmitting line, crosstalk caused by the initializing line to the transmitting line in the first part of subcarriers is already canceled by using the first precoding matrix, without causing the transmit power to exceed the limit, and strong crosstalk caused by the initializing line to the transmitting line in other high-frequency subcarriers except the first part of subcarriers can be canceled by using the second precoding matrix. To cancel strong crosstalk without causing the power to exceed the limit, preferably, a precoding mode of the second precoding matrix and the subscriber signal sent by the transmitting line is nonlinear precoding, so that an apparent increase of transmit power is not caused when strong crosstalk is canceled.

By using the foregoing manner, in the process of performing line initialization by the communication device in this implementation manner, before the feedback channel, for feeding back the downstream error signal, of the initializing line is established, after the first acquiring module 702 acquires the first precoding matrix needed by the first part of subcarriers, the control module 701 controls the sending module 703 to send, by using only the first part of subcarriers, the multiple data signals of all the data signals that need to be sent in the line initialization process. The first part of subcarriers are low-frequency subcarriers and do not cause strong crosstalk to other lines. Therefore, when crosstalk caused by the initializing line to the transmitting line in the first part of subcarriers is canceled by using the first precoding matrix, an apparent increase of transmit power of the transmitting line is not caused. After the sending module 703 sends the multiple data signals by using the first part of subcarriers, the feedback channel, for feeding back the downstream error signal, of the initializing line is established. On this basis, the second acquiring module 704 can acquire the second precoding matrix. In this case, the control module 701 controls the sending module 703 to send, by using the at least second part of subcarriers, the remaining data signals exclusive of the multiple data signals, where the at least second part of subcarriers are preferably all the available subcarriers. Strong crosstalk caused by the initializing line to the transmitting line in the other high-frequency subcarriers, exclusive of the first part of subcarriers, of all the available subcarriers can be canceled by using the second precoding matrix, without causing an apparent increase of transmit power of the transmitting line. Therefore, in the line initialization process, crosstalk caused by the initializing line to the transmitting line in all the available subcarrier can be canceled, without causing an apparent increase of transmit power of the transmitting line.

In another implementation manner of the communication device according to the present invention, after receiving the first control signal, the first acquiring module is specifically configured to send, by using at least a third part of subcarriers of all the available subcarriers, the first probe signal in the downstream direction, to acquire the first precoding matrix needed by the first part of subcarriers.

The at least third part of subcarriers are any subcarriers of all the available subcarriers, and may completely or partly include the first part of subcarriers, or may not include the first part of subcarriers, or may be all the available subcarriers. Specifically, selection may be made according to an actual situation. Preferably, in this implementation manner, the at least third part of subcarriers are the first part of subcarriers, that is, in the downstream direction, the first acquiring module sends the first probe signal by using only the first part of subcarriers. In this case, by receiving the first probe signal, the subscriber end device on the transmitting line can measure the error signal of the first probe signal and feed back the error signal to the first acquiring module. The first acquiring module calculates, according to the error signal, the downstream crosstalk channel from the initializing line to the transmitting line in the first part of subcarriers, and further acquires the first precoding matrix needed by the first part of subcarriers.

Certainly, in other implementation manners, the at least third part of subcarriers may also be other subcarriers, that is, the first acquiring module is not limited to using only the first part of subcarriers for sending the first probe signal, but sends the first probe signal by using other subcarriers, for example, sends the first probe signal by using other subcarriers that do not include the first part of subcarriers or other subcarriers that include only the first part of subcarriers. In this case, after the first acquiring module sends the first probe signal by using other subcarriers, the subscriber end device on the transmitting line feeds back the error signal of the first probe signal. The first acquiring module acquires, according to the error signal, a downstream crosstalk channel from the initializing line to the transmitting line in the other subcarriers, and further estimates, according to the downstream crosstalk channel from the initializing line to the transmitting line in the other subcarriers, the downstream crosstalk channel from the initializing line to the transmitting line in the first part of subcarriers, so as to acquire the first precoding matrix needed by the first part of subcarriers.

Figure 8:
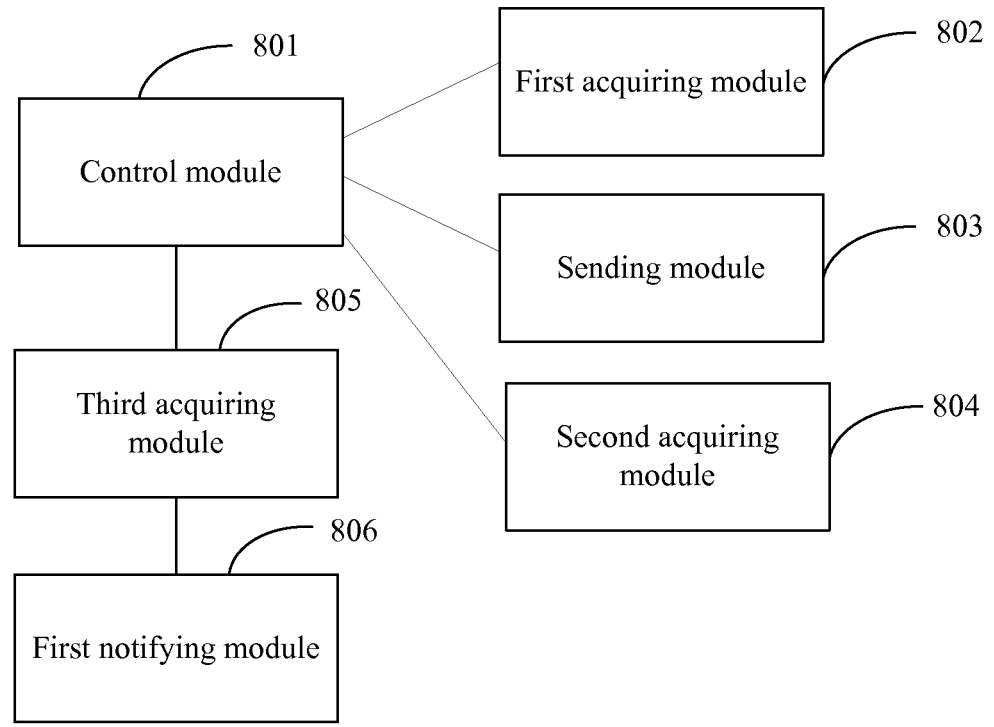
FIG. 8 is a schematic structural diagram of another implementation manner of a communication device according to the present invention.

In addition, referring to FIG. 8, in another implementation manner of a communication device according to the present invention, the communication device further includes a third acquiring module 805 and a first notifying module 806 in addition to a control module 801, a first acquiring module 802, a sending module 803, and a second acquiring module 804.

In this implementation manner, a first part of subcarriers are a set of subcarriers whose center frequencies are not greater than a designated cutoff frequency in all available subcarriers. The designated cutoff frequency is preferably lower than 30 MHz, that is, the first part of subcarriers are in a range lower than 30 MHz, and are low-frequency subcarriers. Before the sending module 803 sends multiple data signals by using the first part of subcarriers, the control module 801 is further configured to send a fifth control signal to the third acquiring module 805. The third acquiring module 805 is configured to acquire the range of the first part of subcarriers according to the designated cutoff frequency after receiving the fifth control signal, that is, the third acquiring module 805 determines the range of the first part of subcarriers according to the designated cutoff frequency. The first notifying module 806 is configured to notify, in a handshake, a subscriber end device on an initializing line in a downstream direction of the range of the first part of subcarriers according to the range, acquired by the third acquiring module 805, of the first part of subcarriers, to notify the subscriber end device on the initializing line that multiple data signals of all data signals that need to be sent in an initialization process will be sent by using the first part of subcarriers.

Certainly, in another implementation manner, the first notifying module may also notify, after the handshake is completed, the subscriber end device on the initializing line of the range of the first part of subcarriers when a first data signal of the multiple data signals is sent by using the first part of subcarriers. In addition, the third acquiring module may also be configured to acquire the range of the first part of subcarriers according to a subcarrier sequence number threshold corresponding to the designated cutoff frequency.

Figure 9:
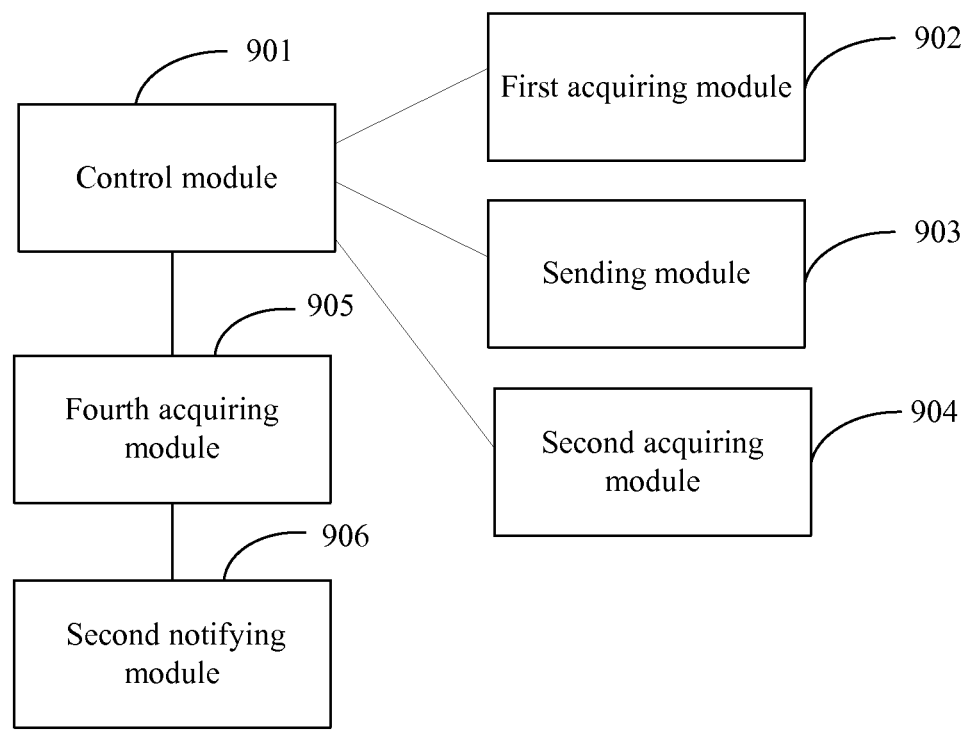
FIG. 9 is a schematic structural diagram of still another implementation manner of a communication device according to the present invention.

Referring to FIG. 9, in still another implementation manner of a communication device according to the present invention, the communication device further includes a fourth acquiring module 905 and a second notifying module 906 in addition to a control module 901, a first acquiring module 902, a sending module 903, and a second acquiring module 904. After the second acquiring module 904 acquires a second precoding matrix needed by at least a second part of subcarriers, the control module 901 is further configured to send a sixth control signal to the fourth acquiring module 905. The fourth acquiring module 905 is configured to acquire a range of the at least second part of subcarriers after the sixth control signal is received. In this case, the second notifying module 906 notifies, according to the range of the at least second part of subcarriers that is acquired by the fourth acquiring module 905, the range of the at least second part of subcarriers to a subscriber end device on an initializing line in a downstream direction, to indicate, to the subscriber end device, that the sending module will send, by using the at least second part of subcarriers, remaining data signals of all data signals that need to be sent in an initialization process. Certainly, the second notifying module 906 may also directly notify the subscriber end device that the subscriber end device is no longer limited to using the first part of subcarriers for sending multiple data signals.

In addition, in another implementation manner, the notification message may also not be sent to the subscriber end device on the initializing line, but by using a control function of the control module, the sending module sends, by directly using the at least second part of subcarriers, the remaining data signals of all the data signals that need to be sent in the initialization process.

Figure 10:
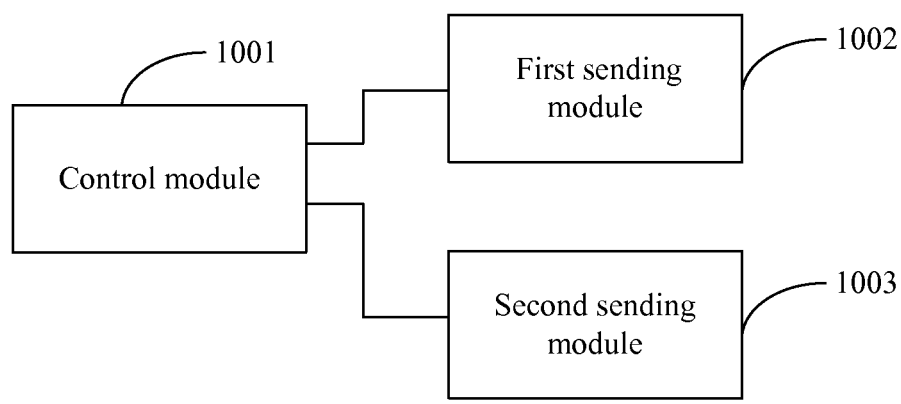
FIG. 10 is a schematic structural diagram of an implementation manner of a terminal device according to the present invention.

Referring to FIG. 10, in an implementation manner of a terminal device according to the present invention, the terminal device includes a control module 1001, a first sending module 1002, and a second sending module 1003.

Before a feedback channel, for an upstream error signal, of an initializing line is established, or when a central office end device in an upstream direction cannot correctly measure an upstream error signal of an initializing line, the control module 1001 is configured to send a first control signal to the first sending module 1002 to control the first sending module 1002 to send a signal. The first sending module 1002 is configured to send a first probe signal in the upstream direction after receiving the first control signal, so that the central office end device in the upstream acquires a first crosstalk cancellation function needed by a first part of subcarriers of all available subcarriers. Specifically, when the first sending module 1002 sends the first probe signal to the central office end device, a transmitting line undergoes crosstalk caused by the initializing line. For the transmitting line, the central office end device further receives the crosstalk caused by the initializing line to the transmitting line, in addition to a subscriber signal of the transmitting line. In this case, the central office end device measures an error signal of the first probe signal, and calculates, according to the error signal, an upstream crosstalk channel from the initializing line to the transmitting line in the first part of subcarriers, so as to acquire, according to the upstream crosstalk channel, the first crosstalk cancellation function needed by the first part of subcarriers. All the available subcarriers are recorded as a set, and the first part of subcarriers are a subset in the set of all the available subcarriers, where the subset is neither an empty set, nor equal to the set of all the available subcarriers.

After acquiring the first crosstalk cancellation function, the central office end device notifies, by using some designation messages, the control module 1001 that acquisition of the first crosstalk cancellation function is completed. In this case, the control module 1001 is configured to send a second control signal to the second sending module 1003. The second sending module 1003 is configured to send, by using the first part of subcarriers after receiving the second control signal, multiple data signals of all data signals that need to be sent in an initialization process. By using the process of sending the multiple data signals, the central office end device can acquire a capability of correctly parsing the upstream error signal of the initializing line, or can establish the feedback channel, for feeding back the upstream error signal, of the initializing line. After the central office end device acquires the first crosstalk cancellation function needed by the first part of subcarriers, the second sending module 1003 sends, to the central office end device with normal transmit power by using only the first part of subcarriers, the multiple data signals of all the data signals that need to be sent in the initialization process, but does not send any signal or sends signals with power far lower than normal transmit power in other available subcarriers except the first part of subcarriers, so that strong crosstalk is not caused to other transmitting lines as far as possible. Because the central office end device has acquired the first crosstalk cancellation function needed by the first part of subcarriers, when receiving the subscriber signal of the transmitting line, the central office end device performs crosstalk cancellation processing by using the subscriber signal of the transmitting line and the first crosstalk cancellation function, so as to cancel the crosstalk caused to the transmitting line by the initializing line when the multiple data signals are sent in the first part of subcarriers, and therefore, the subscriber signal of the transmitting line finally received by the central office end device does not include any crosstalk signal from the initializing line, and a bit error rate of the transmitting line is reduced.

After the feedback channel, for feeding back the upstream error signal, of the initializing line is established, or after the central office end device has the capability of correctly parsing the upstream error signal of the initializing line, and after the second sending module 1003 sends the multiple data signals by using the first part of subcarriers, the control module 1001 is configured to send a third control signal to the first sending module 1002. The first sending module 1002 is configured to send, by using at least a second part of subcarriers of all the available subcarriers after receiving the third control signal, a second probe signal in the upstream direction, so that the central office end device acquires a second crosstalk cancellation function needed by the at least second part of subcarriers. The at least second part of subcarriers are any subcarriers of all the available subcarriers, and may completely or partly include the first part of subcarriers, or may not include the first part of subcarriers, or may be all the available subcarriers. By receiving the second probe signal, the central office end device can calculate an error signal of the second probe signal, and acquire, according to the error signal, an upstream crosstalk channel from the initializing line to the transmitting line in the at least second part of subcarriers. On a basis that the feedback channel, for the upstream error signal, of the initializing line is already established or that the central office end device has the capability of correctly parsing the upstream error signal of the initializing line, the central office end device can acquire an upstream crosstalk channel from the transmitting line to the initializing line. At this stage, the central office end device can acquire all upstream crosstalk channels, so as to calculate, according to all the upstream crosstalk channels, the second crosstalk cancellation function needed by the at least second part of subcarriers.

After acquiring the second crosstalk cancellation function, the central office end device notifies, by using some designation messages, the control module 1001 that acquisition of the second crosstalk cancellation function is completed. In this case, the control module 1001 is configured to send a fourth control signal to the second sending module 1003. The second sending module 1003 is configured to send, by using the at least second part of subcarriers after receiving the fourth control signal, remaining data signals of all the data signals that need to be sent in the initialization process, to complete line initialization. When the second sending module 1003 sends the remaining data signals by using the at least second part of subcarriers, crosstalk is also caused to the transmitting line. After acquiring the second crosstalk cancellation function, when receiving a subscriber signal of the transmitting line, the central office end device performs crosstalk cancellation processing by using the subscriber signal of the transmitting line and the second crosstalk cancellation function, so as to cancel the crosstalk caused to the transmitting line by the initializing line when the remaining data signals are sent in the at least second part of subcarriers, and the subscriber signal of the transmitting line finally received by the central office end device does not include any crosstalk signal from the initializing line.

In another implementation manner of the terminal device according to the present invention, the first sending module is specifically configured to send, by using at least a third part of subcarriers of all the available subcarriers after receiving the first control signal, the first probe signal in the upstream direction, so that the central office end device in the upstream direction acquires the first crosstalk cancellation function.

The at least third part of subcarriers are any subcarriers of all the available subcarriers, and may partly or completely include the first part of subcarriers, or may not include the first part of subcarriers, or may be all the available subcarriers. Specifically, selection may be made according to an actual situation. Preferably, in this implementation manner, the at least third part of subcarriers are the first part of subcarriers, that is, the first sending module sends the first probe signal to the central office end device by using only the first part of subcarriers. Therefore, the central office end device can acquire a first error signal of the first probe signal, and the central office end device calculates, according to the first error signal, an upstream crosstalk signal from the initializing line to the transmitting line in the first part of subcarriers, and further acquires the first crosstalk cancellation function needed by the first part of subcarriers.

In other implementation manners, the at least third part of subcarriers are other subcarriers, that is, the first sending module is not limited to using only the first part of subcarriers for sending the first probe signal, but sends the first probe signal to the central office end device by using other subcarriers, for example, sends the first probe signal to the central office end device by using other subcarriers that does not include the first part of subcarriers or other subcarriers that include only the first part of subcarriers. In this case, the central office end device measures the error signal of the first probe signal according to the first probe signal, and acquires, according to the error signal, an upstream crosstalk channel from the initializing line to the transmitting line in the other subcarriers, and further estimates, according to the upstream crosstalk channel from the initializing line to the transmitting line in the other subcarriers, the upstream crosstalk channel from the initializing line to the transmitting line in the first part of subcarriers, so as to acquire the first crosstalk cancellation function needed by the first part of subcarriers.

Figure 11:
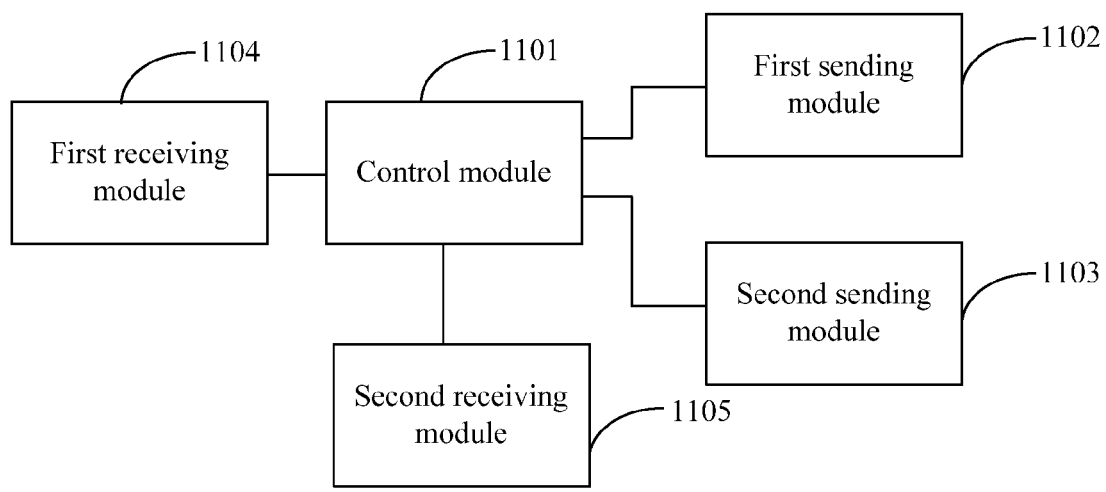
FIG. 11 is a schematic structural diagram of another implementation manner of a terminal device according to the present invention.

In addition, referring to FIG. 11, in still another implementation manner of a terminal device according to the present invention, the terminal device in this implementation manner includes a control module 1101, a first sending module 1102, a second sending module 1103, a first receiving module 1104, and a second receiving module 1105. In this implementation manner, a first part of subcarriers are a set of subcarriers whose center frequencies are not greater than a designated cutoff frequency in all available subcarriers. Preferably, the designated cutoff frequency is 30 MHz, that is, center frequencies of the first part of subcarriers are not greater than 30 MHz, and are low-frequency subcarriers. The first receiving module 1104 is configured to receive a first designation message that carries information about the designated cutoff frequency and that is sent by a central office end device, to acquire a range of the first part of subcarriers; and notify the control module 1101 of the range of the first part of subcarriers. The central office end device notifies the terminal device of the range of the first part of subcarriers by using the first designation message. After learning the range of the first part of subcarriers, the control module 1101 sends a second control signal to the second sending module 1103 to control the second sending module 1103 to send multiple data signals by using the first part of subcarriers. Further, the first receiving module 1104 is specifically configured to receive the first designation message that carries information about a subcarrier sequence number threshold corresponding to the designated cutoff frequency and that is sent by the central office end device, to acquire the range of the first part of subcarriers. The range of the first part of subcarriers may also be represented by subcarrier sequence numbers. After the central office end device has a capability of correctly parsing an upstream error signal of an initializing line, or has established a feedback channel for an upstream error signal, after the second sending module 1103 sends the multiple data signals by using the first part of subcarriers, and before the first sending module 1102 sends a second probe signal by using at least a second part of subcarriers, the central office end device notifies the second receiving module 1105 of a range of the at least second part of subcarriers by using some designation messages. The second receiving module 1105 is configured to receive a second designation message that carries information about the range of the at least second part of subcarriers and that is sent by the central office end device, to acquire the range of the at least second part of subcarriers; and notify the control module 1101 of the range of the at least second part of subcarriers, so that the control module 1101 controls the first sending module 1102 to send the second probe signal by using the at least second part of subcarriers.

Certainly, in another implementation manner, when the central office end device directly notifies the second receiving module 1105 that no limitation is set to: using only the first part of subcarriers for sending the multiple data signals, the second receiving module 1105 is configured to receive a third designation message carrying information indicating that no limitation is set to: using the first part of subcarriers for sending the multiple data signals, and notify the control module 1101 of the third designation message. Therefore, the control module 1101 controls the first sending module 1102 to send the second probe signal by using the at least second part of subcarriers. In addition, in a subsequent process, the control module 1101 controls the second sending module 1103 to send remaining data signals by using the at least second part of subcarriers, and the second sending module 1103 is no longer limited to using the first part of subcarriers for sending the data signals.

Figure 12:
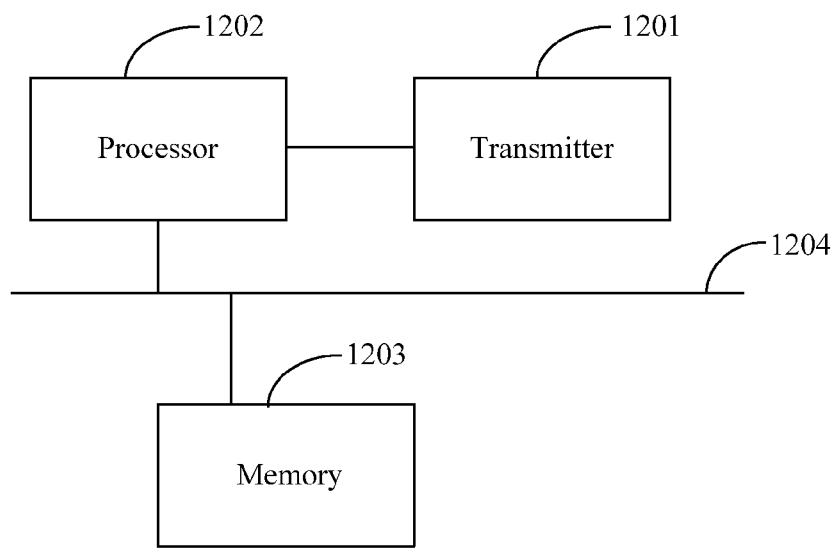
FIG. 12 is a schematic structural diagram of still another implementation manner of a communication device according to the present invention.

Referring to FIG. 12, the present invention further provides an implementation manner of a communication device, including a transmitter 1201, a processor 1202, a memory 1203, and a bus 1204. The processor is connected to the memory 1203 by using the bus 1204.

The memory 1203 is configured to store data information needed in a line initialization process, where the data information includes a probe signal used for probing a channel in the line initialization process and all data signals that need to be sent in the line initialization process, where the data signals include symbols used for sending messages and training parameters that need to be sent in the line initialization process, and the like.

Before a feedback channel, for a downstream error signal, of the initializing line is established, the processor 1202 first acquires, from the memory 1203, a first probe signal used for probing a channel, and sends the first probe signal to the transmitter 1201, so that the transmitter 1201 sends the first probe signal in the downstream direction to acquire a first precoding matrix needed by a first part of subcarriers of all available subcarriers. Afterwards, the processor 1202 is configured to acquire, from the memory 1203, multiple data signals of all the data signals that need to be sent in the line initialization process, send the multiple data signals to the transmitter 1201, and control the transmitter 1201 to send the multiple data signals by using the first part of subcarriers. The feedback channel, for feeding back the downstream error signal, of the initializing line is established in the process of sending the multiple data signals. When the transmitter 1201 sends the multiple data signals by using the first part of subcarriers, crosstalk caused by the initializing line to a transmitting line in the first part of subcarriers can be canceled by using the first precoding matrix. Furthermore, the first part of subcarriers are preferably low-frequency subcarriers, so that an apparent increase of transmit power of the transmitting line is not caused when crosstalk cancellation processing is performed by using the first precoding matrix.

After the feedback channel, for the downstream error signal, of the initializing line is established, and after the transmitter 1201 sends the multiple data signals by using the first part of subcarriers, the processor 1202 is configured to acquire, from the memory 1203, a second probe signal used for probing a channel, send the second probe signal to the transmitter 1201, and control the transmitter 1201 to send the second probe signal by using at least a second part of subcarriers of all the available subcarriers, so that on a basis that the feedback channel for the downstream error signal is established, a second precoding matrix needed by the at least second part of subcarriers can be acquired. Afterwards, the processor 1202 controls the transmitter 1201 to send, by using the at least second part of subcarriers, remaining data signals, exclusive of the multiple data signals, of all the data signals that need to be sent in the initialization process, to complete line initialization. By using the second precoding matrix, when the transmitter 1201 sends the data signals by using the at least second part of subcarriers, crosstalk caused by the initializing line to the transmitting line in the at least second part of subcarriers can be canceled, and in particular, strong crosstalk caused by the initializing line to the transmitting line can be canceled, without easily causing an apparent increase of the transmit power of the transmitting line. In addition, because the feedback channel, for the downstream error signal, of the initializing line is already established, the initializing line has a capability of feeding back the downstream error signal. In this case, crosstalk caused by the transmitting line to the initializing line can also be canceled. Further, after the feedback channel, for the downstream error signal, of the initializing line is established, crosstalk between all lines can be canceled.

It should be noted that, in other multi-subcarrier OFDM MIMO (multiple-input and multiple-output, multiple-input and multiple-output) joint processing systems, the foregoing implementation manners of the present invention may also be used to perform a line initialization process, which is not limited to being used in a VDSL2 system only.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for line initialization, comprising:
    sending a first probe signal in a downstream direction to acquire a first precoding matrix needed by a first part of subcarriers of all available subcarriers;
    sending, using the first part of subcarriers, multiple data signals selected from all data signals that need to be sent in an initialization process;
    after the multiple data signals are sent by using the first part of subcarriers, sending, using at least a second part of subcarriers of all of the available subcarriers, a second probe signal in the downstream direction to acquire a second precoding matrix needed by the at least second part of subcarriers; and
    sending, using the at least second part of subcarriers, remaining data signals, exclusive of the multiple data signals, of all of the data signals that need to be sent in the initialization process, to complete line initialization.

2. The method according to claim 1, wherein the sending the first probe signal in the downstream direction to acquire the first precoding matrix needed by the first part of subcarriers of all of the available subcarriers comprises:
    sending, using at least a third part of subcarriers of all of the available subcarriers, the first probe signal in the downstream direction to acquire the first precoding matrix, wherein the at least third part of subcarriers are any subcarriers of all of the available subcarriers.

3. The method according to claim 1, wherein the first part of subcarriers are a set of subcarriers whose center frequencies are not greater than a designated cutoff frequency in all the available subcarriers; and
wherein the method further comprises:
acquiring a range of the first part of subcarriers according to the designated cutoff frequency before the sending, using the first part of subcarriers, multiple data signals of all of the data signals that need to be sent in an initialization process; and
notifying, in a handshake, a subscriber end device in the downstream direction of the range of the first part of subcarriers, or after a handshake is completed, notifying a subscriber end device of the range of the first part of subcarriers when a first data signal of the multiple data signals is sent using the first part of subcarriers.

4. The method according to claim 3, wherein the step of acquiring the range of the first part of subcarriers according to the designated cutoff frequency comprises:
acquiring the range of the first part of subcarriers according to a subcarrier sequence number threshold corresponding to the designated cutoff frequency.

5. The method according to claim 1, wherein the method further comprises performing, after the sending a second probe signal in the downstream direction, at least one of:
acquiring a range of the second part of subcarriers, and notifying a subscriber end device in the downstream direction of the range of the second part of subcarriers; or
notifying a subscriber end device in the downstream direction that the subscriber end device is no longer limited to using the first part of subcarriers for sending the multiple data signals.

6. A method for line initialization, comprising:
sending a first probe signal in an upstream direction, so that a central office end device in the upstream direction acquires a first crosstalk cancellation function needed by a first part of subcarriers of all available subcarriers;
sending, using the first part of subcarriers, multiple data signals selected from all data signals that need to be sent in an initialization process;
sending, using at least a second part of subcarriers of all the available subcarriers and after the multiple data signals are sent by using the first part of subcarriers, a second probe signal in the upstream direction, so that the central office end device acquires a second crosstalk cancellation function needed by the at least second part of subcarriers; and
sending, using the at least second part of subcarriers, remaining data signals, exclusive of the multiple data signals, of all of the data signals that need to be sent in the initialization process, to complete line initialization.

7. The method according to claim 6, wherein the sending the first probe signal in an upstream direction comprises:
sending, using at least a third part of subcarriers of all of the available subcarriers, the first probe signal in the upstream direction, so that the central office end device in the upstream direction acquires the first crosstalk cancellation function, wherein the at least third part of subcarriers are any subcarriers of all of the available subcarriers.

8. The method according to claim 6, wherein the first part of subcarriers are a set of subcarriers whose center frequencies are not greater than a designated cutoff frequency in all of the available subcarriers; and wherein the method further comprises:
receiving, before the sending the first probe signal in the upstream direction, a first designation message carrying information about the designated cutoff frequency, to acquire a range of the first part of subcarriers.

9. The method according to claim 8, wherein the receiving the first designation message carrying information about the designated cutoff frequency comprises:
receiving the first designation message carrying information about a subcarrier sequence number threshold corresponding to the designated cutoff frequency, to acquire the range of the first part of subcarriers.

10. The method according to claim 6, wherein the method further comprises performing, before the step of sending a second probe signal in the upstream direction, at least one of:
receiving a second designation message carrying information about a range of the at least second part of subcarriers; or
receiving a third designation message carrying information indicating that no limitation is set to using the first part of subcarriers for sending the multiple data signals.

11. A communication device, comprising:
a processor;
a non-transitory computer readable medium connected to the processor and having stored thereon instructions that, when executed, cause the processor to:
send a first probe signal in a downstream direction of an initializing line, to acquire a first precoding matrix needed by a first part of subcarriers of all available subcarriers;
send, using the first part of subcarriers and after the acquiring the first precoding matrix, multiple data signals of all data signals that need to be sent in a line initialization process;
send, using at least a second part of subcarriers of all of the available subcarriers after the sending the multiple data signals using the first part of subcarriers, a second probe signal in the downstream direction of the initializing line, to acquire a second precoding matrix needed by the at least second part of subcarriers;
send, using the at least second part of subcarriers and after the acquiring the second precoding matrix, remaining data signals, exclusive of the multiple data signals, of all of the data signals that need to be sent in the initialization process, to complete line initialization.

12. The communication device according to claim 11, wherein the instructions that, when executed, cause the processor to send the first probe signal in the downstream direction of the initializing line comprise instructions, that when executed, cause the processor to:
send, using at least a third part of subcarriers of all of the available subcarriers, the first probe signal in the downstream direction of the initializing line, to acquire the first precoding matrix, wherein the at least third part of subcarriers are any subcarriers of all of the available subcarriers.

13. The communication device according to claim 11, wherein the first part of subcarriers are a set of subcarriers whose center frequencies are not greater than a designated cutoff frequency in all of the available subcarriers; and
wherein the non-transitory computer readable medium further has stored thereon instructions that, when executed, cause the processor to:

acquire a range of the first part of subcarriers according to the designated cutoff frequency; and notify, in a handshake, a subscriber end device in the downstream direction of the range of the first part of subcarriers after the acquiring the range of the first part of subcarriers, or notify, after a handshake is completed, a subscriber end device of the range of the first part of subcarriers when a first data signal of the multiple data signals is sent using the first part of subcarriers.

14. The communication device according to claim 13, wherein the instructions that, when executed, cause the processor to acquire the range of the first part of subcarriers according to the designated cutoff frequency comprise instructions, that when executed, cause the processor to:

acquire the range of the first part of subcarriers according to a subcarrier sequence number threshold corresponding to the designated cutoff frequency.

15. The communication device according to claim 11, wherein the non-transitory computer readable medium further has stored thereon instructions that, when executed, cause the processor to:

a range of the second part of subcarriers; and notify a subscriber end device in the downstream direction of the range of the second part of subcarriers, or notify a subscriber end device in the downstream direction that the subscriber end device is no longer limited to using the first part of subcarriers for sending the multiple data signals.

16. A terminal device, comprising:

a processor;

a non-transitory computer readable medium connected to the processor and having stored thereon instructions that, when executed, cause the processor to:

send a first probe signal in an upstream direction of an initializing line, so that a central office end device in the upstream direction acquires a first crosstalk cancellation function needed by a first part of subcarriers of all available subcarriers;

send, using the first part of subcarriers, multiple data signals of all data signals that need to be sent in a line initialization process;

send, using at least a second part of subcarriers of all the available subcarriers and after the sending the multiple data signals using the first part of subcarriers, a second probe signal in the upstream direction, so that the central office end device acquires a second crosstalk cancellation function needed by the at least second part of subcarriers; and send, using the at least second part of subcarriers, remaining data signals, exclusive of the multiple data signals, of all of the data signals that need to be sent in the initialization process, to complete line initialization.

17. The terminal device according to claim 16, wherein the instructions that, when executed, cause the processor to send the first probe signal in the upstream direction of the initializing line comprise instructions, that when executed, cause the processor to:

send, using at least a third part of subcarriers of all of the available subcarriers, the first probe signal in the upstream direction, so that the central office end device in the upstream direction acquires the first crosstalk cancellation function, wherein the at least third part of subcarriers are any subcarriers of all of the available subcarriers.

18. The terminal device according to claim 16, wherein the first part of subcarriers are a set of subcarriers whose center frequencies are not greater than a designated cutoff frequency in all the available subcarriers; and wherein the non-transitory computer readable medium further has stored thereon instructions that, when executed, cause the processor to:

receive a first designation message carrying information about the designated cutoff frequency, to acquire a range of the first part of subcarriers.

19. The terminal device according to claim 18, wherein:

wherein the instructions that, when executed, cause the processor to receive the first designation message carrying information about the designated cutoff frequency comprise instructions, that when executed, cause the processor to:

receive the first designation message carrying information about a subcarrier sequence number threshold corresponding to the designated cutoff frequency, to acquire the range of the first part of subcarriers.

20. The terminal device according to claim 16, wherein the non-transitory computer readable medium further has stored thereon instructions that, when executed, cause the processor to:

receive a second designation message carrying information about a range of the at least second part of subcarriers, or receive a third designation message carrying information indicating that no limitation is set to using the first part of subcarriers for sending the multiple data signals.

21. A communication device, comprising:

a transmitter;

a non-transitory computer readable memory configured to store data information needed in a line initialization process; and a processor connected to the transmitter and to the non-transitory computer readable memory and configured to acquire, from the non-transitory computer readable memory, a first probe signal in the data information, and control the transmitter to send the first probe signal in a downstream direction of an initializing line to acquire a first precoding matrix needed by a first part of subcarriers of all available subcarriers;

wherein the processor is configured to acquire, from the memory, multiple data signals of all data signals that need to be sent in the data information, and control the transmitter to send the multiple data signals by using the first part of subcarriers;

wherein the processor is configured to acquire, from the memory and after the transmitter sends the multiple data signals by using the first part of subcarriers, a second probe signal in the data information, and wherein the processor is further configured control the transmitter to send, by using at least a second part of subcarriers of all the available subcarriers, the second probe signal to acquire a second precoding matrix needed by the at least second part of subcarriers; and wherein the processor is further configured to acquire, from the memory, remaining data signals, exclusive of the multiple data signals, of all of the data signals that need to be sent in the data information, and control the transmitter to send, using the at least second part of subcarriers, the remaining data signals to complete line initialization.

* * * * *